United States Patent
Sun

(10) Patent No.: US 9,821,760 B2
(45) Date of Patent: Nov. 21, 2017

(54) LOCKING DEVICE, VEHICLE SEAT BELT ADJUSTING DEVICE, AND VEHICLE SEAT BELT

(71) Applicant: Yingui Sun, Beijing (CN)

(72) Inventor: Yingui Sun, Beijing (CN)

( * ) Notice: Subject to any disclaimer, the term of this patent is extended or adjusted under 35 U.S.C. 154(b) by 0 days.

(21) Appl. No.: 14/785,126

(22) PCT Filed: Apr. 17, 2013

(86) PCT No.: PCT/CN2013/074327
§ 371 (c)(1),
(2) Date: Oct. 16, 2015

(87) PCT Pub. No.: WO2014/169452
PCT Pub. Date: Oct. 23, 2014

(65) Prior Publication Data
US 2016/0082921 A1 Mar. 24, 2016

(51) Int. Cl.
*B60R 22/42* (2006.01)
*B60R 22/34* (2006.01)
*B60R 22/185* (2006.01)

(52) U.S. Cl.
CPC ............ *B60R 22/42* (2013.01); *B60R 22/185* (2013.01); *B60R 22/1855* (2013.01);
(Continued)

(58) Field of Classification Search
CPC .... B60R 22/42; B60R 22/185; B60R 22/1855
See application file for complete search history.

(56) References Cited

U.S. PATENT DOCUMENTS 3,227,489 A * 1/1966 Stubblefield .......... B60R 22/357
   24/196
3,926,385 A * 12/1975 Board .................. B60R 22/353
   242/381.4

(Continued)

FOREIGN PATENT DOCUMENTS

CN  1853991  11/2006
CN  1944119  4/2007

(Continued)

OTHER PUBLICATIONS

International Search Report PCT/CN2013/074327, dated Jan. 16, 2014.

(Continued)

*Primary Examiner* — James A English
(74) *Attorney, Agent, or Firm* — Bryan Cave LLP

(57) ABSTRACT

A locking apparatus used for controlling a movable chain, strip or strap-shaped object (71) comprising a support frame; a roll shaft (6) with a friction surface or a sprocket pitch slot (64), the roll shaft (6) being fixedly connected to a support rod (66), and one end of the support rod (66) being pivotally connected onto the support frame; a pawl (62) disposed above the roll shaft (6) and capable of rotating around one end; and a pressurization body (3) opposite to the roll shaft (6) along a transverse direction, thereby forming a roll gap between the roll shaft (6) and the pressurization body (3). The roll shaft (6) can freely rotate when the roll shaft (6) is in a middle state. When the roll shaft (6) is forced to downwards pivot until a ratchet disposed on a contact base (65) engages with a ratchet (6302) of the roll shaft (6) to prevent the rotation of the roll shaft (6), the object (71) can be locked. When the roll shaft (6) is forced upwards pivot until the ratchet (6302) of the roll shaft (6) abuts against the pawl (62), the roll shaft (6) can still rotate; when the object (71) changes the direction to downwards move, the pawl (Continued)

(62) engages with the ratchet (6302) of the roll shaft (6) to prevent the rotation of the roll shaft (6) and loses the engagement with the ratchet (6302) of the roll shaft (6) as the roll shaft (6) downwards pivots.

20 Claims, 16 Drawing Sheets

(52) U.S. Cl.
CPC ...... *B60R 22/34* (2013.01); *B60R 2022/3402* (2013.01); *B60R 2022/3421* (2013.01)

(56) References Cited

U.S. PATENT DOCUMENTS

| | | | |
|---|---|---|---|
| 4,249,708 A | 2/1981 | Asano | |
| 4,398,680 A | 8/1983 | Ogawa et al. | |
| 4,519,555 A | 5/1985 | Tukamoto | |
| 4,718,148 A * | 1/1988 | McKernon | B60R 22/1855 24/170 |
| 4,723,728 A * | 2/1988 | Kanada | B60R 22/44 242/385 |
| 4,768,809 A * | 9/1988 | Andersson | B60R 22/1958 280/806 |
| 4,773,613 A | 9/1988 | Kawai et al. | |
| 4,809,925 A * | 3/1989 | Takada | B60R 22/44 242/372 |
| 5,118,135 A * | 6/1992 | Yano | B60R 22/42 180/282 |
| 5,186,063 A * | 2/1993 | Nishizawa | B60R 22/1958 280/806 |
| 5,588,611 A * | 12/1996 | Osumi | B60R 22/42 242/381.1 |
| 2007/0069060 A1 * | 3/2007 | Maciejczyk | B60R 22/347 242/381.1 |
| 2013/0214584 A1 * | 8/2013 | Sun | B60R 22/20 297/480 |

FOREIGN PATENT DOCUMENTS

| | | |
|---|---|---|
| EP | 0175246 | 3/1986 |
| EP | 1717113 | 11/2006 |
| GB | 2232062 | 12/1990 |
| JP | S56173356 | 12/1981 |
| JP | S5736951 | 2/1982 |
| JP | 61-66049 | 5/1986 |
| JP | 06270761 | 9/1994 |
| JP | 3094867 | 4/2003 |
| JP | 2013536123 | 9/2013 |
| KR | 200240653 Y1 | 7/2001 |
| WO | 2012025062 | 3/2012 |

OTHER PUBLICATIONS

Japanese Office Action from corresponding application JP2016-507966 dated Jan. 10, 2017.
Russian Office Action from corresponding application RU 2015148994/11 dated Feb. 7, 2017 (14 pages).
Korean Office Action from corresponding application KR10-2015-7032781 (6 pgs) dated Oct. 11, 2016.
Extended European Search Report from corresponding application EP13882549.2 (7 pgs) dated Nov. 14, 2016.
Notice of Allowance from corresponding Korean Application No. 10-2015-7032781 dated May 10, 2017.

* cited by examiner

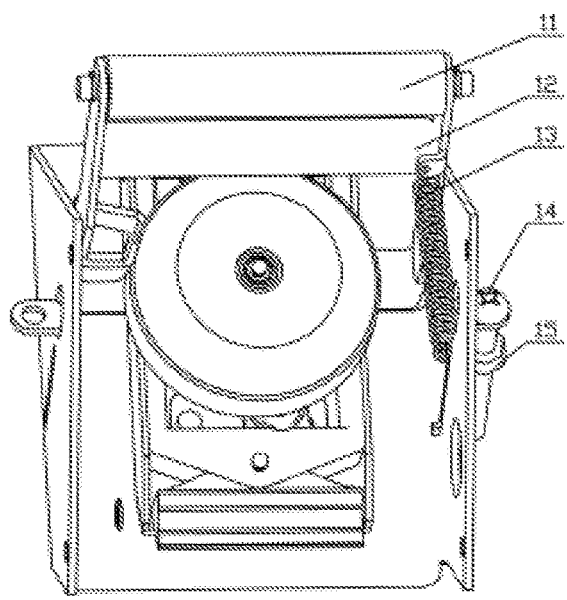
Fig. 29A
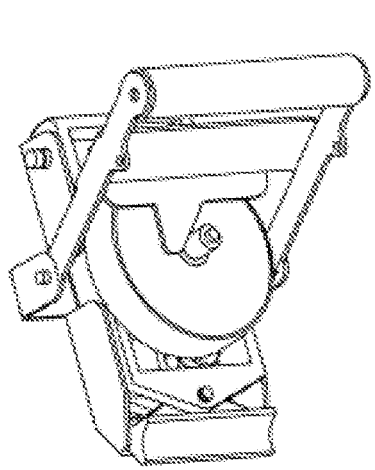 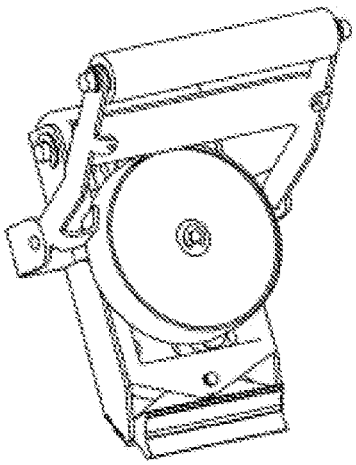
Fig. 29B                    Fig. 29C

LOCKING DEVICE, VEHICLE SEAT BELT ADJUSTING DEVICE, AND VEHICLE SEAT BELT

CROSS-REFERENCE TO RELATED APPLICATIONS

This application is a national stage application under 35 U.S.C. 371 and claims priority to International Application No. PCT/CN2013/074327, filed Apr. 17, 2013. International Application No. PCT/CN2013/074327 is incorporated herein by reference.

TECHNICAL FIELD

The present disclosure relates to a locking device, a vehicle seat belt adjusting device, and a vehicle seat belt.

BACKGROUND

In modern industrial production, often it is desirable to control the movement and locking of movable chain, strip or belt objects. Hence, there is always a demand for developing locking devices with favorable performance.

In addition, in many apparatuses, it is desirable to control the rotation of rollers. For example, in elevator systems, it is desirable to control the rotation of rollers for elevator running and stop; moreover, it is desirable to achieve instantaneous stop control. For another example, the mooring cables or anchor chains of ships are often reeled up and retracted by means of rollers, and it is often desirable to release the locking of cables or anchor chains quickly.

Particularly, for example, the seat belts on vehicles (e.g., motor vehicles) are fittings that receive wide attention, and it is of great significance to control the movement of the straps of seat belts. Owing to the sense of pressure on the user caused by the seat belts, many people don't like seat belts, and even don't wear a seat belt whenever it is possible. Even worse, to deal with compulsory checking on wearing seat belt, some users wrap the strap of seat belt slackly on their bodies by altering partial functions of the seat belt at own discretion. For example, these users pin the strap with rigid members to the vehicle body so that the strap can't be retracted, in order to avoid the sense of pressure on their bodies. Such behaviors introduce risks in the protective functions of seat belts.

The present inventor has disclosed a vehicle seat belt adjusting device in PCT Application No. WO2012/026062. The adjusting device comprises a pair of supporting swing rods composed of a first swing rod and a second swing rod and an actuator, wherein, the adjacent ends of the first and second swing rods are hinged together to form an included angle between the swing rods, one non-adjacent end of the first and second swing rods is stationary, while the other non-adjacent end moves as the included angle between the swing rod varies; the actuator applies force to the first swing rod and/or the second swing rod and/or the hinge point between the swing rods to change the included angle between the swing rods, and thereby applies variable force to the strap of the seat belt directly via the movable non-adjacent end. According to the actual requirement, the adjusting device can be designed in a way that the non-adjacent ends provide full supporting force perpendicularly on the strap and thereby restrain the strap from moving when the first swing rod and the second swing rod are in a 180° vertically aligned state. The actuator is particularly an inertia weight.

The adjusting device disclosed in the Patent Application No. WO2012/026062 can be further improved.

SUMMARY

An object of the present disclosure is to provide a locking device with favorable performance for controlling a movable chain, strip or belt object.

Another object of the present disclosure is to provide a locking device that can release a roller shaft with ratchets quickly.

Yet another object of the present disclosure is to provide a vehicle seat belt locking device, which enables the seat belt to render the user a "sense of zero pressure" on the body and enables the seat belt to be agile and reliable in operation, and easy and convenient to use.

Still yet another object of the present disclosure is to provide a vehicle seat belt, which can render the user a "sense of zero pressure" on the body, is agile and reliable in operation, and is easy and convenient to use.

To that end, the present disclosure provides a locking device for controlling a movable chain, strip, or belt object, comprising: a supporting frame for mounting purpose; a roller shaft with a frictional surface or a sprocket pitch groove, having ratchets and having a frictional surface or a sprocket pitch groove along at least a part of its length in its axial direction, which can rotate around its axis and is fixedly connected with a supporting rod one end of which is pivotally connected to the supporting frame; a pawl disposed above the roller shaft and capable pivoting around one end; and, a pressing body opposite to the roller shaft in transverse direction, wherein, a roller gap through which the chain, strip or belt object can pass is formed between the roller shaft and the pressing body, and the pressing body is movable so as to apply force to the chain, strip or belt object. Wherein, when the roller shaft is in a neutral state in which it is not subject to the pressure from the pressing body and the pressure from the object, it can rotate freely; when the chain, strip, or belt object moves downwards and the pressing body applies pressure against the chain, strip or belt object and thereby applies pressure to the roller shaft, the roller shaft will pivot downwards along with the supporting rod, till the ratchets on a contact base arranged on the supporting frame engage with the ratchets on the roller shaft and thereby restrain the rotation of the roller shaft, so that the chain, strip or belt object is clamped and locked up; and, when the chain, strip or belt object moves upwards and the pressing body releases the chain, strip or belt object, the roller shaft will pivot upwards along with the supporting rod, till a ratchet on the roller shaft abuts against the pawl; when the chain, strip, or belt object changes to move downwards, the pawl will engage with a ratchet on the roller shaft and thereby restrain the rotation of the roller shaft, and will pivot downwards along with the roller shaft and thereby further disengage from the ratchet on the roller shaft.

Preferably, the end of the press body opposite to the roller shaft is arc-shaped, so that it assists the roller shaft to accomplish upward or downward pivoting and locking actions.

Preferably, the pawl has an elastic member, which applies preloaded downward pressure on the pawl.

With the roller shaft mechanism described above, the locking device disclosed in the present disclosure can transit between different states flexibly and smoothly, and thereby control the movement of the chain, strip or belt object through the roller gap in vertical direction excellently.

The present disclosure further provides a locking device for controlling the rotation of a roller shaft, comprising: a roller shaft which has ratchets and can rotate around its axis; and, a pawl comprising a connecting part and a locking part, one end of the connecting part being pivotally fixed, the other end of the connecting part being hinged to one end of the locking part, and the other end of the locking part being configured to engage with the ratchets and thereby lock up the roller shaft; and, an actuator which can manually or automatically bend the pawl at the hinge point quickly, so that the pawl disengages from the roller shaft quickly, when it is desired to control the pawl to release the roller shaft so that the roller shaft can rotate.

Preferably, the roller shaft is configured to reel up and release a flexible chain, strip or belt object. When it is desired to rotate the roller shaft to reel up or release the chain, strip or belt object, the actuator can manually or automatically bend the pawl at the hinge point quickly, so that the pawl disengages from the roller shaft quickly.

The locking device can release a roller shaft with ratchets quickly, and is of great significance for an apparatus in which it is desirable to release the locking of a pawl quickly.

The present disclosure further provides a vehicle seat belt adjusting device, comprising: a supporting frame for mounting purpose; a roller shaft with a frictional surface, having ratchets and having a frictional surface along at least a part of its length in its axial direction, which can rotate around its axis and is fixedly connected with a supporting rod one end of which is pivotally connected to the supporting frame; a pawl disposed above the roller shaft; a pressing body comprising a pair of supporting swing rods composed of a first swing rod and a second swing rod, wherein the adjacent ends of the first and second swing rods are hinged together and form an included angle between the swing rods, one non-adjacent end of the first and second swing rods is stationary, while the other non-adjacent end moves as the included angle between the swing rods varies, and is opposite to the roller shaft in transverse direction, and a roller gap through which a strap of the seat belt can pass is formed between the roller shaft and the other non-adjacent end; and, an actuator which applies force to the first swing rod and/or the second swing rod and/or the hinge point between the swing rods so as to change the included angle between the swing rods, and thereby relieves the force for locking the strap applied by the other non-adjacent end. Wherein, when the first swing rod and the second swing rod are in a 180° vertically aligned state, the other non-adjacent end minimizes the roller gap and applies pressure on the strap, so as to clamp the strap and lock up it; when the included angle between the swing rods is changed via the actuator in response to a signal of low force, the other non-adjacent end can release the strap. Wherein, when the roller shaft is in a neutral state in which it is not subject to the pressure from the pressing body and the pressure from the strap, it can rotate freely; when the strap moves downwards under the action of a retractor and the other non-adjacent end applies pressure against the strap and thereby applies pressure to the roller shaft, the roller shaft will pivot downwards along with the supporting rod, till the ratchets on a contact base arranged on the supporting frame engage with the ratchets on the roller shaft and thereby restrain the rotation of the roller shaft, so that the strap is clamped and locked; and, when the strap is pulled to move upwards and the other non-adjacent end releases the strap, the roller shaft will pivot upwards along with the supporting rod, till a ratchet on the roller shaft abuts against the pawl that is disposed above the roller shaft and can pivot around its axis; when the strap changes to move downwards under the action of the retractor, the pawl will engage with a ratchet on the roller shaft and thereby restrain the rotation of the roller shaft, and will pivot downwards along with the roller shaft and thereby further disengage from the ratchet on the roller shaft.

Preferably, the actuator is an inertia weight mounted on the first swing rod and/or on the second swing rod and/or at the hinge point between the swing rods; particularly, the inertia weight is a disk-shaped object; more particularly, the inertia weight can rotate freely around its central mounting shaft.

Preferably, the locking device further comprises a trigger configured to trigger the actuator, wherein, the trigger actuates the first swing rod and the second swing rod to deviate from 180° and thereby enter into an out-of-balance state.

Preferably, the trigger comprises a link bar structure and an elastic member, wherein, one end of the link bar structure is pivotally fixed to the supporting frame, while the other end of the link bar structure abuts against the strap, and the elastic member enables the other end to apply preloaded pressure on the strap. In addition, the link bar structure further comprises a protrusion that protrudes towards the inertia weight, wherein, the protrusion can push the inertia weight into an out-of-balance state when the link bar structure pivots to a certain degree; preferably, the protrusion pushes and presses a circumferential part of the inertia weight in radial direction; preferably, the protrusion will not push the inertia weight into an out-of-balance state when the seat belt user only feels 0-0.1 lb pressure.

Preferably, the tip portion of the non-adjacent end opposite to the roller shaft is arc-shaped, so that it assists the roller shaft to accomplish upward or downward pivoting and locking actions.

Preferably, the pawl has an elastic member, which applies preloaded downward pressure on the pawl.

Preferably, the adjusting device further comprise a slit configured to guide the strap, wherein, the slit is spaced from the roller gap and is arranged above the roller gap, so that the strap can move along the path between the slit and the roller gap.

Preferably, the principal plane of the pressing body that comprises the first swing rod and the second swing rod is at an angle between 10° and 80° from the horizontal plane, particularly is at 60°, 65°, 70° or 75°; the other non-adjacent end is close to the roller shaft, so that the roller gap is gradually reduced when the first swing rod and the second swing rod approach 180°.

Preferably, the pressing body further comprises a generally rectangular swing rod carriage, a pressing block, and a transverse member, the generally rectangular swing rod carriage comprising two longitudinal walls that are generally parallel to each other, with a slotted hole arranged in the upper end of each longitudinal wall; one non-adjacent end of the first and second swing rods is pivotally connected to the transverse member, and the other non-adjacent end of the first and second swing rods is pivotally connected to a transverse wall of the swing rod carriage at the side opposite to the slotted holes; the pressing block is pivotally connected to the transverse wall and works with the roller shaft to form the roller gap; the two ends of the transverse member pass through the slotted holes and are fixed to the supporting frame respectively, so that the swing rod carriage carries the pressing block to move along the slotted holes when the included angle between the first swing rod and the second swing rod varies; preferably, the pressing body further comprises an elastic member that is disposed on the swing rod carriage and configured to actuate the first swing rod and the second swing rod to return to the 180° balanced state.

Preferably, the pressing body further comprises a slideway, which is mounted on the supporting frame, with its lower end at an angle between 16° and 40° in relation to its principal plane, preferably at a 30° angle; accordingly, the back side of the pressing block is at the same angle in relation to the principal plane of the assembly composed of the swing rod carriage and the pressing block, and the back side of the pressing block is supported on the lower end of the slideway and slides.

Preferably, the pressing body further comprises a stop part arranged at the hinge point and configured to stop the hinge point when the first swing rod and the second swing rod return to the 180° balanced state, so that the hinged part between the first swing rod and the second swing rod obtains excessive support to some degree; preferably, the first swing rod and the second swing rod are mounted inclined in relation to the two longitudinal walls that are generally parallel to each other.

Preferably, the adjusting device further comprises an elastic compression element, which is disposed at the lock body of the seat belt fixed to a side of the seat, or is configured as a part of the buckle of the seat belt, so that the user can press the lock body and the buckle downwards by 10-60 mm by compressing the elastic compression element after he/she fastens the buckle into the lock body; after that, the elastic compression element can reset automatically.

Preferably, the elastic compression element comprises a housing, a spring, and a connecting rod, wherein, the spring is contained in the housing, one end of the connecting rod is fixedly connected to the lock body or buckle, a part of the connecting rod passes through a hole of the housing and is received in the housing, and the connecting rod is connected with the spring and can be pressed downwards.

Preferably, the elastic compression element further comprises an elastic damping member, so that the elastic compression element can be elongated in a damped manner when the strap of the seat belt is subjected to great pulling force.

Preferably, the housing is enclosed, only with a small hole for venting to the ambient environment, so that the connecting rod can only reset slowly after it is pressed downwards.

Preferably, the supporting rod has a tail stop part that utilizes a sealing element to seal against the inner wall of the housing, wherein, the tail stop part abuts against the spring, the outer diameter of the tail stop part is greater than the outer diameter of the supporting rod in vicinity, and the tail stop part has a through-hole, so that the space that contains the spring is the only space that vents to the ambient environment via the through-hole and thereby the connecting rod can only reset slowly after it is pressed downwards.

Preferably, the seat belt further comprises a suspender, which is mounted to the vehicle and configured for the strap to pass through and to support the strap.

Preferably, the seat belt comprises: a suspender that is suspended to the vehicle and configured to fix the upper end of the seat belt nearby a shoulder of the occupant, and a retractor that is arranged near the lower part of the seat at a side of the seat and configured to retract the seat belt inwards; the adjusting device is arranged at any position between the suspender and the retractor, preferably is directly mounted on the upper part of the retractor.

Preferably, the supporting frame is a part of the retractor, so that the adjusting device is integrated in the retractor.

Preferably, the adjusting device further comprises a retractor, wherein, the supporting frame is mounted on the retractor at the opening for the strap, or the supporting frame is an integral part of the retractor housing.

Preferably, the adjusting device is configured into a left adjusting device or right adjusting device, depending on whether the adjusting device is mounted at the left side of the seat or at the right side of the seat.

The present disclosure further provides a vehicle seat belt, comprising a retractor and the adjusting device described above, wherein, the adjusting device is arranged at a position between the suspender and the retractor, or the mounting frame of the adjusting device is a part of the retractor, so that the adjusting device is integrated in the retractor.

Preferably, the coil spring of the retractor has a variable cross section, so that the coil spring has essentially the same elasticity regardless of the amount of deformation, and thereby the seat belt is subjected to the same acting force from the coil spring when the strap of the seat belt is pulled out or retracted.

Preferably, the coil plate of the coil spring has the same thickness but gradually reduced width along the longitudinal direction; or, the coil plate of the coil spring has the same width but gradually reduced thickness along the longitudinal direction.

The adjusting device disclosed in the present disclosure can utilize swing rod force that is infinitely high theoretically to lock up the strap, and can unlock easily and automatically in response to a signal of low force as well. The adjusting device and the seat belt disclosed in the present disclosure can control the retraction and extension of the strap finely and even renders the user a "sense of zero pressure" of the seat belt on the body. What is particularly significant for actual applications is that the adjusting device disclosed in the present disclosure is agile and reliable in operation and the seat belt disclosed in the present disclosure is easy and simple to use, and can be operated routinely.

DESCRIPTION OF THE DRAWINGS

FIGS. 25-27 are perspective views of three different forms of link bar structures for the trigger of the adjusting device respectively;

FIG. 28 is a sectional view of the pressing body in the adjusting device;

DETAILED DESCRIPTION OF THE EMBODIMENTS

Hereinafter some embodiments of the present disclosure will be detailed with reference to the accompanying drawings.

The embodiments described here are specific embodiments of the present disclosure, and are provided only to explain the ideal of the present disclosure. All these embodiments are explanatory and exemplary, and shall not be interpreted as constituting any limitation to the embodiments and the scope of the present disclosure. Besides the embodiments described here, those skilled in the art can use other obvious technical schemes on the basis of the disclosure in the attached claims and the specification, and these technical schemes include technical schemes that are obtained by making obvious modifications, substitutions, and combinations to the embodiments described here. The scope of the technical scheme claimed for protection in the present disclosure is only confined by the claims.

First Embodiment of the Locking Device According to the Present Disclosure

Figure 1:
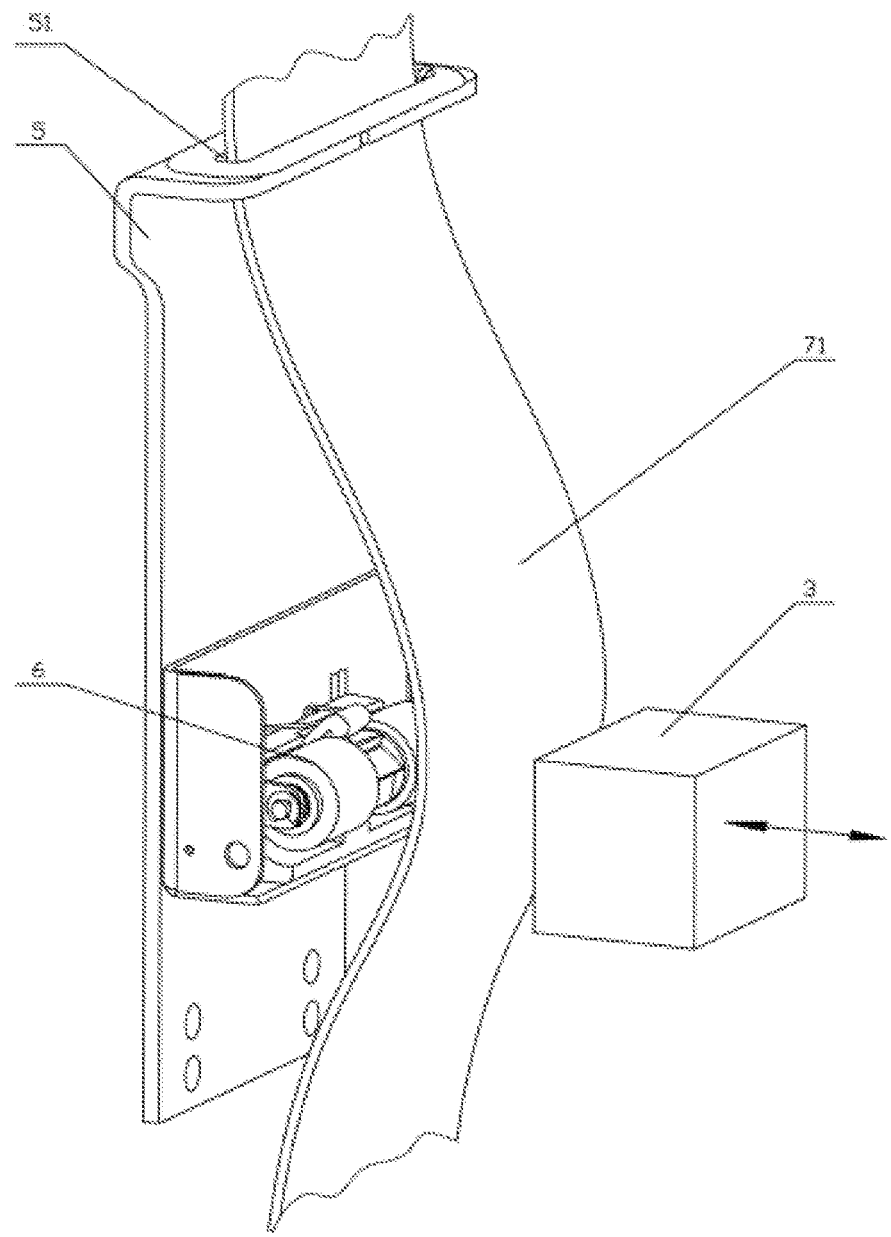
FIG. 1 is a schematic diagram of a first embodiment of the locking device according to the present disclosure.

FIG. 1 shows a first embodiment of the locking device according to the present disclosure schematically. The locking device in this embodiment is configured to control a moveable chain, strip or belt object 71, and comprises a roller shaft mechanism 6, a pressing body 3, and a supporting plate 5. In some embodiments, chain, strip or belt object 71 might be referred to as a strap 71. The roller shaft mechanism 6 is mounted on the supporting plate 5, and works with the pressing body 3 to form a roller gap through which the chain, strip or belt object 71 can pass. The pressing body 3 is opposite to the roller shaft in transverse direction, with its left side away from or close to the roller shaft. The pressing body 3 applies pressure to the roller shaft via the chain, strip or belt object 71, so as to lock up or release the chain, strip or belt body 71. In this embodiment, a guide slit 51 is arranged in the supporting plate 5 to confine the path of movement of the chain, strip or belt object 71.

Figure 2:
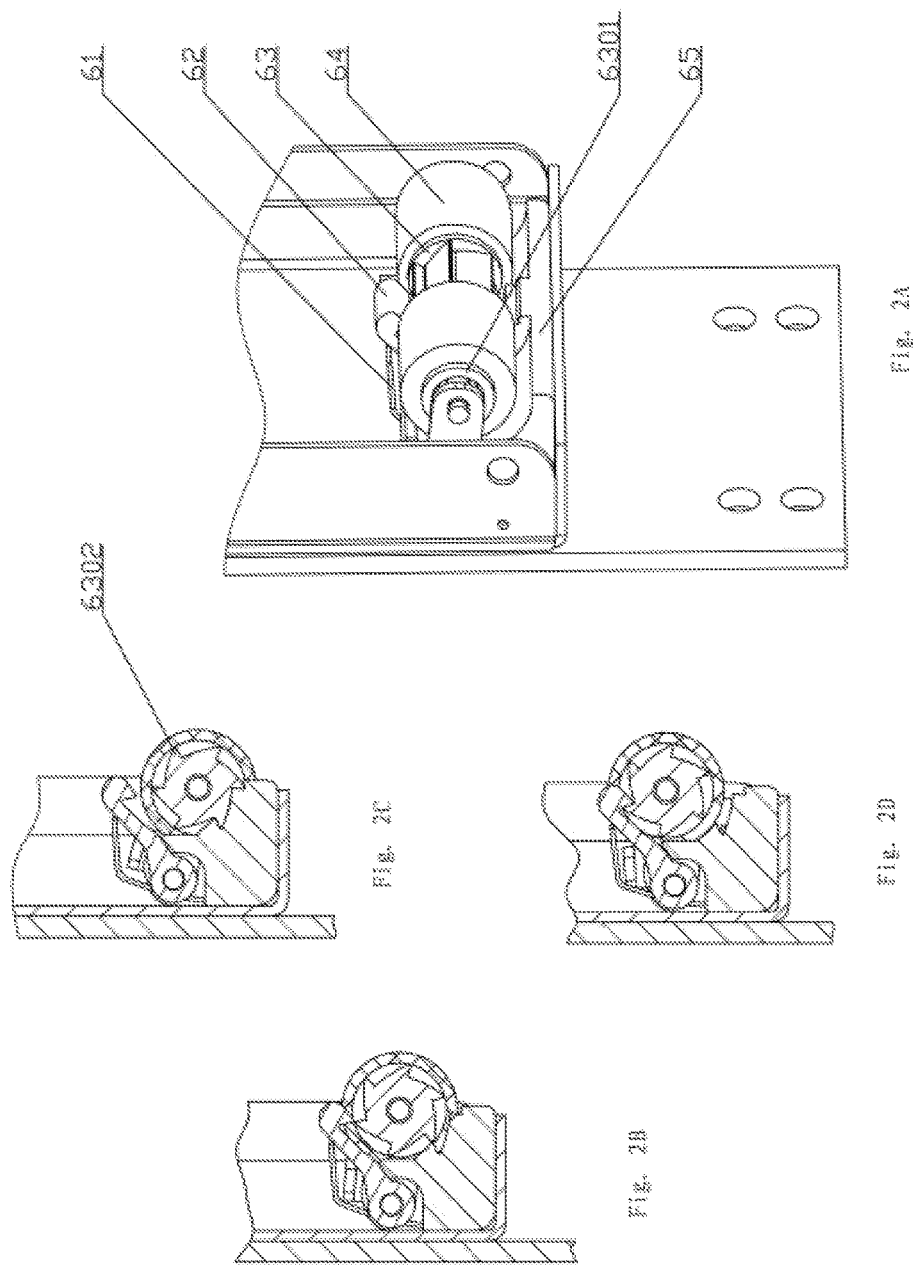
FIG. 2A is a perspective view of the roller shaft mechanism in the locking device according to the present disclosure.
FIGS. 2B, 2C and 2D are sectional views taken along a section line passing through the ratchets of the roller shaft, showing the roller shaft in the roller shaft mechanism in neutral state, downwardly engaged state, and upwardly engaged state, respectively.
Figure 3:
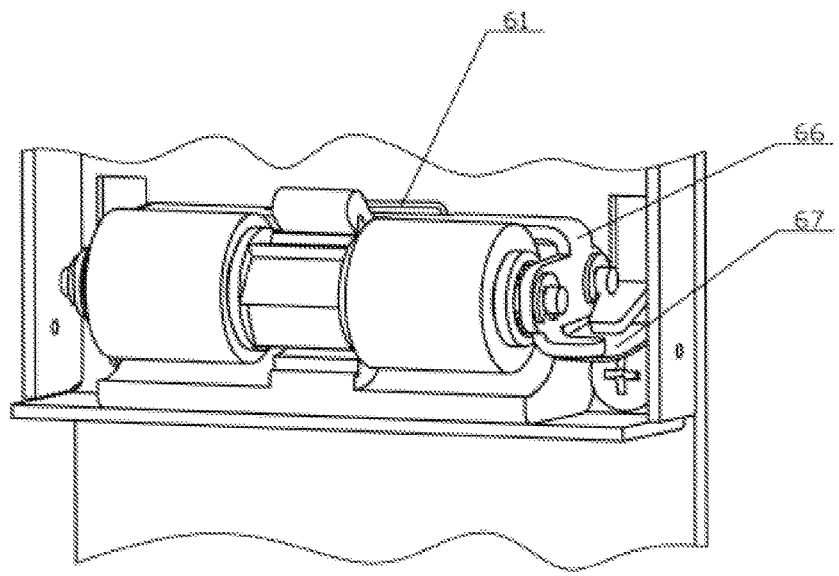
FIG. 3 is a perspective view of the roller shaft mechanism observed at another angle of view.
Figure 4:
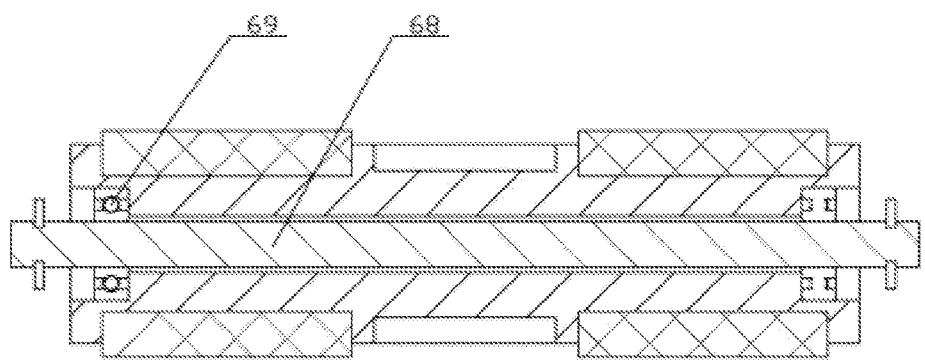
FIG. 4 is a sectional view of the roller shaft.

As shown in FIGS. 2A, 3, and 4, the roller shaft mechanism 6 comprises: a roller shaft, which comprises a main body of roller shaft 63 and a frictional surface or a sprocket pitch groove 64; a pawl 62; a torsional spring of pawl 61; a supporting rod of roller shaft 66; a positioning plate 67; and, a contact base 65. FIG. 4 is a sectional view of the roller shaft, and FIGS. 5-9 show the torsional spring of pawl 61, pawl 62, main body of roller shaft 63, supporting rod of roller shaft 66, and contact base 65 respectively and separately.

The frictional surface of the roller shaft is configured to interact with the chain, strip or belt object. For some chain objects, such as the chain of a chain hoist, in which adjacent annular chain links are end-to-end linked up with each other at 90°, arranging a sprocket pitch groove instead of a frictional surface on the roller shaft can attain a better control effect. The sprocket pitch groove matches the chain links of the chain and can engage with the individual chain links stably.

The ratchets 6302 on the roller shaft are arranged on the middle part of the main body of roller shaft 63, with a frictional surface 64 arranged at both sides of the ratchet 6302. The frictional surface 64 is made of a frictional material, such as rubber or plastics, or the frictional surface 64 can be a knurled surface, for example. The frictional surface 64 can be a frictional layer coated on the main body of roller shaft 63, or can be a hollow ferrule, which is fixed to the main body 63 as shown in FIG. 4. In some embodiments of the present disclosure, the roller shaft has a frictional surface along at least a part of its length in its axial direction.

Figure 9:
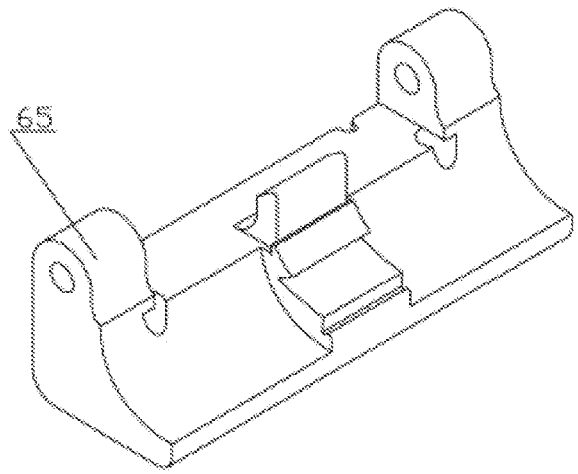
FIG. 9 is a perspective view of the contact base.

The roller shaft can rotate around its axis, and is fixedly connected to the supporting rod 66 via a shaft 68, and one end of the supporting rod is pivotally connected to the contact base 65. The contact base 65 is mounted on the supporting plate 5, has shaft holes as shown in FIG. 9, and has ratchets on its middle part, which match the ratchets 6302 on the roller shaft. The supporting rod 66 is connected to the contact base 65 via a pivot shaft mounted in the shaft holes. In addition, the pawl 62 and the torsional spring 61 are also mounted on the pivot shaft.

In this embodiment, the main body of roller shaft 64 has a central shaft hole for receiving the shaft 68, and a roller bearing 69 can be provided between the shaft hole and the shaft to reduce friction and make the rotation smoother. The shaft 68 is mounted in the shaft hole of the contact base 65 as shown in FIG. 9.

FIGS. 2B, 2C and 2D are sectional views taken along a section line passing through the ratchets of the roller shaft, showing the roller shaft in the roller shaft mechanism in neutral state, downwardly engaged state, and upwardly engaged state, respectively.

Figure 5:
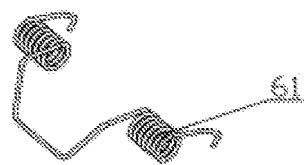
FIG. 5 is a perspective view of the preload spring of the pawl.
Figure 6:
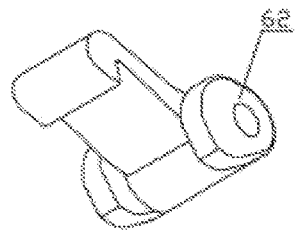
FIG. 6 is a perspective view of the pawl.

The pawl 62 as shown in FIG. 6 is disposed above the roller shaft and can pivot around one end. When the pawl doesn't contact with the roller shaft, the lower part of the pawl abuts against a step on the contact base, so that the pawl can't rotate downwards. The pawl 62 is subjected to the preloaded downward pressure from the torsional spring 61 as shown in FIG. 5, and the spring coil of the torsional spring 61 is fitted over the pivot shaft.

Please see FIGS. 2A, 2B, and 3, when the roller shaft is in a neutral state in which it is not subject to external force, it can rotate freely. In that state, a protrusion on the supporting rod of roller shaft 66 abuts against the elastic plate 67, so that the roller shaft and the supporting rod of roller shaft are stopped by the elastic plate, to prevent the roller shaft that can pivot via the supporting rod 66 from contacting with the contact base 65, i.e., prevent the ratchets on the roller shaft from engaging with the ratchets on the contact base. In addition, since the pawl 62 is stopped because that its lower part abuts against the step on the contact base 65, the pawl 62 doesn't contact with the roller shaft. Hence, the roller shaft can rotate freely, and, in this state, the chain, strip or belt object 71 can pass through the roller gap freely.

Please see FIG. 2C. If the chain, strip or belt object 71 moves downwards and the pressing body 3 applies pressure to the chain, strip or belt object 71 and thereby applies pressure to the roller shaft, under the synergistic action of the frictional surface 64, the roller shaft and the supporting rod will overcome the spring force of the elastic plate 67 and pivot downwards together, till the ratchets on the contact base 65 engage with the ratchets 6302 on the roller shaft and thereby restrain the rotation of the roller shaft, so that the chain, strip or belt object is clamped and locked.

Furthermore, please see FIG. 2D. If the chain, strip or belt object 71 moves upwards and the pressing body 3 release the chain, strip or belt object 71, under the restoring force of the elastic plate 67, the roller shaft will be lifted upwards and thereby disengage from the ratchets on the contact base 65, so that the roller shaft can rotate. In addition, owing to the friction force between the frictional surface 64 and the chain, strip or belt object 71, the roller shaft will pivot upwards along with the supporting rod, till a ratchet 6302 on the roller shaft abuts against the pawl 62; then, the roller shaft and the supporting rod will pivot upwards further, till the supporting rod 66 abuts against the housing of the roller shaft mechanism. However, since the roller shaft rotates in a direction that doesn't result in engagement between the ratchets 6302 and the pawl 62, the roller shaft still can rotate in that state. Now, if the chain, strip or belt object 71 changes to move downwards, the roller shaft will rotate in the reversed direction owing to the friction force between the frictional surface 64 and the chain, strip or belt object 71. As the roller shaft rotates in the reversed direction, the pawl 62 will engage with a ratchet 6302 on the roller shaft and thereby restrain the rotation of the roller shaft; as a result, the chain, strip or belt object 71 in the roller gap will quickly follow the roller shaft to pivot downwards. When the chain, strip or belt object 71 changes to move downwards, the pressing body 3 will move towards the roller shaft and thereby reduce the roller gap, and the roller shaft mechanism will transit to the locked state shown in FIG. 2B, so as to accomplish locking.

With the roller shaft mechanism described above, the locking device described in the above embodiment can transit between different states flexibly and smoothly, and thereby control the movement of the chain, strip or belt object 71 through the roller gap in vertical direction excellently. To facilitate the control of movement of the chain, strip or belt object 71 and realize quick and timely control, usually the roll gap should be small as far as possible. In such a circumstance, the locking device disclosed in the present disclosure can utilize the feature of smooth state transition provided by the roller shaft mechanism to quickly and reliably lock up or release the chain, strip or belt object 71.

Preferably, the end of the pressing body 3 opposite to the roller shaft is arc-shaped, so that it can assist the roller shaft to accomplish upward or downward pivoting and locking actions in a better way.

II. Second Embodiment of the Locking Device According to the Present Disclosure

Figure 10:
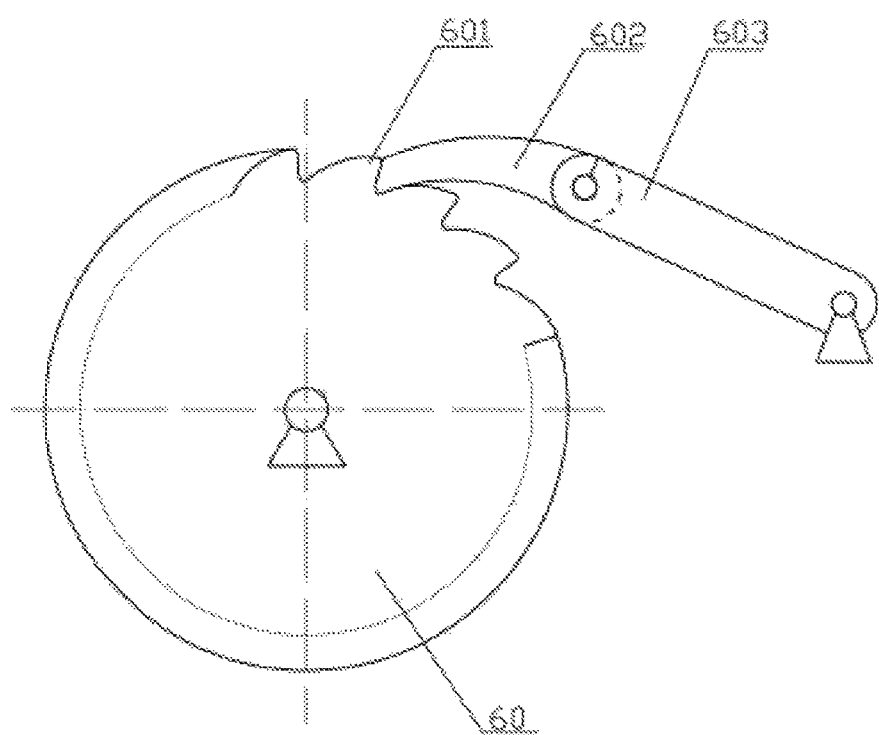
FIG. 10 is a schematic diagram of a second embodiment of the locking device according to the present disclosure.

FIG. 10 is a schematic diagram of a second embodiment of the locking device according to the present disclosure. The locking device comprises a roller shaft and a pawl, wherein, the roller shaft can rotate around its central axis and has ratchets 601; the pawl comprises a connecting part 603 and a locking part 602, one end of the connecting part 603 is pivotally fixed to a pivot point, the other end of the connecting part 603 is hinged to one end of the locking part 602, and the other end of the locking part 602 is configured to engage with the ratchets 601 and thereby lock up the roller shaft.

Moreover, the locking device further comprises an actuator, wherein, when it is desirable to control the pawl to release the roller shaft, the actuator can manually or automatically actuate the hinge point of the pawl quickly to move upwards and thereby bend the connecting part 603 and the locking part 602 at the hinge point, so that the pawl disengages from the roller shaft very quickly, because one end of the connecting part 603 is pivotally fixed to the pivot point and can pivot and the hinge point also can pivot.

The connecting part 603 and the locking part 602 are connected at approx. 180° as shown in the figure. When that angle is reached, the hinged part between the connecting part 603 and the locking part 602 cannot pivot any more, but can only be bent inwardly, like in the case of a folding knife. Nevertheless, the connection angle between the connecting part 603 and the locking part 602 is not limited to approx. 180°; in other words, an angle smaller than 180° can be selected, such as 170° or 160°, etc.

Locking devices that utilize ratchets can be widely applied in industrial equipment. For example, in elevator systems, at present, a shaft gripping scheme is usually used for roller shaft control, because it is difficult to utilize a conventional pawl structure to realize instantaneous stop control. However, sometimes such a shaft gripping scheme may result in a dangerous scenario of elevator skidding or even casualty accidents owing to unreliable shaft gripping. For another example, for the mooring cables or anchor chains of ships, it is easy to reel up the mooring cable or anchor chain and lock up the roller shaft, but it is much more difficult to release the mooring cable or anchor chain. Compared with the prior art, the locking device described in the second embodiment can release the roller shaft quickly. Hence, the locking device is of great significance in occasions where it is desirable to unlock the pawl quickly.

III. Embodiments of the Vehicle Seat Belt Adjusting Device

Figure 11:
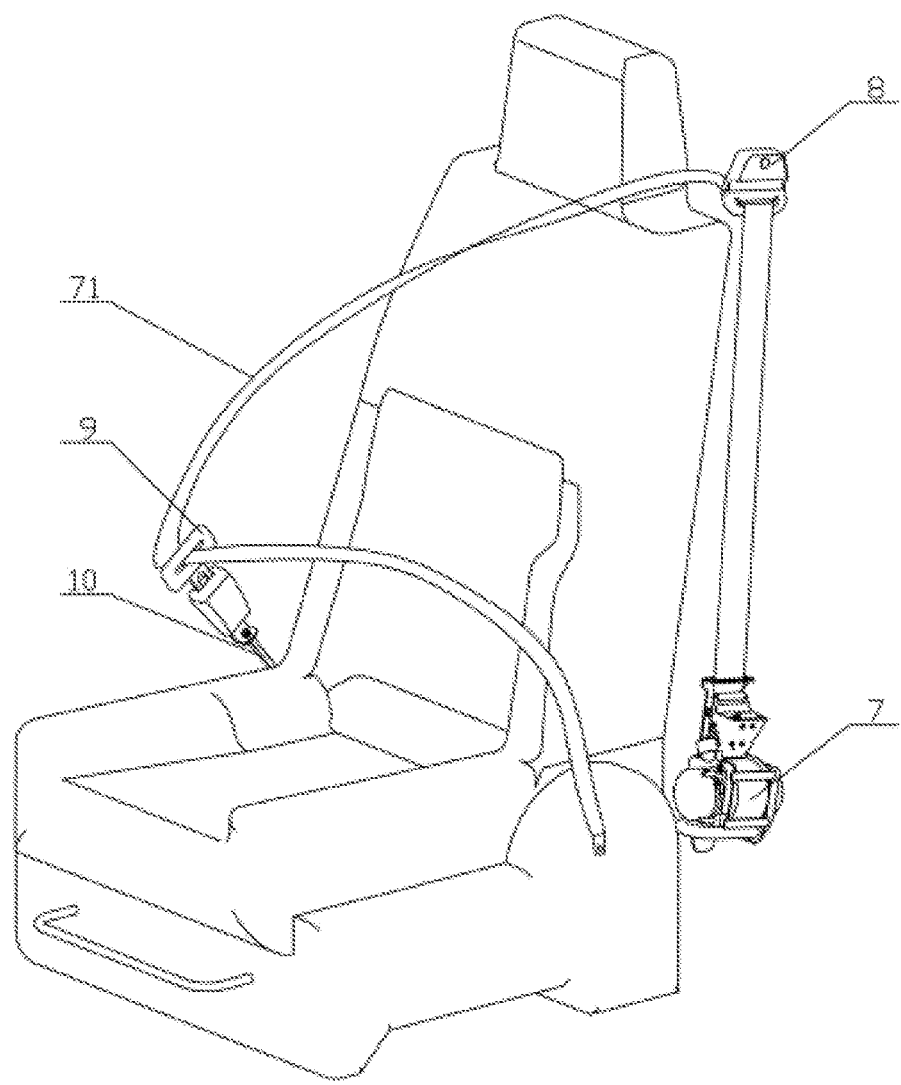
FIG. 11 is a schematic diagram of the seat belt according to the present disclosure.

FIG. 11 shows the seat belt disclosed in the present disclosure, illustrated as a typical three-point seat belt mounted on an individual seat in a vehicle. The seat belt shown in the figure comprises: a strap 71; a suspender 8 fixed to the upper part of the vehicle body nearby a shoulder of the occupant; a buckle lock 9 having a buckle and a lock body, fixed to the lower part of the vehicle body at one side of the seat; a seat belt retractor 7 fixed to the lower part of the vehicle body at the other side of the seat; and the adjusting device disclosed in the present disclosure, disposed at a strap opening of the retractor 7.

Please note: though the adjusting device disclosed in the present disclosure is arranged at the strap opening of the retractor 7 in this example, actually the adjusting device disclosed in the present disclosure can be mounted at any position between the suspender 8 and the strap opening of the retractor 7, for example, the adjusting device can be arranged in the middle between the suspender 8 and the strap opening of the retractor 7, arranged near the suspender 8, or directly mounted together with the suspender 8 or integrated with the suspender 8 into an assembly, so that the suspender 8 not only provides a suspension function but also is connected with the adjusting device together. In addition, the supporting frame (detailed later) for the adjusting device disclosed in the present disclosure can be an integral part of the retractor housing, so that the adjusting device is integrated in the retractor 7. As another embodiment, the adjusting device disclosed in the present disclosure can be defined as comprising the retractor 7, if the supporting frame for the adjusting device is mounted on the retractor 7 at the strap opening or is an integral part of the retractor housing.

Figure 12:
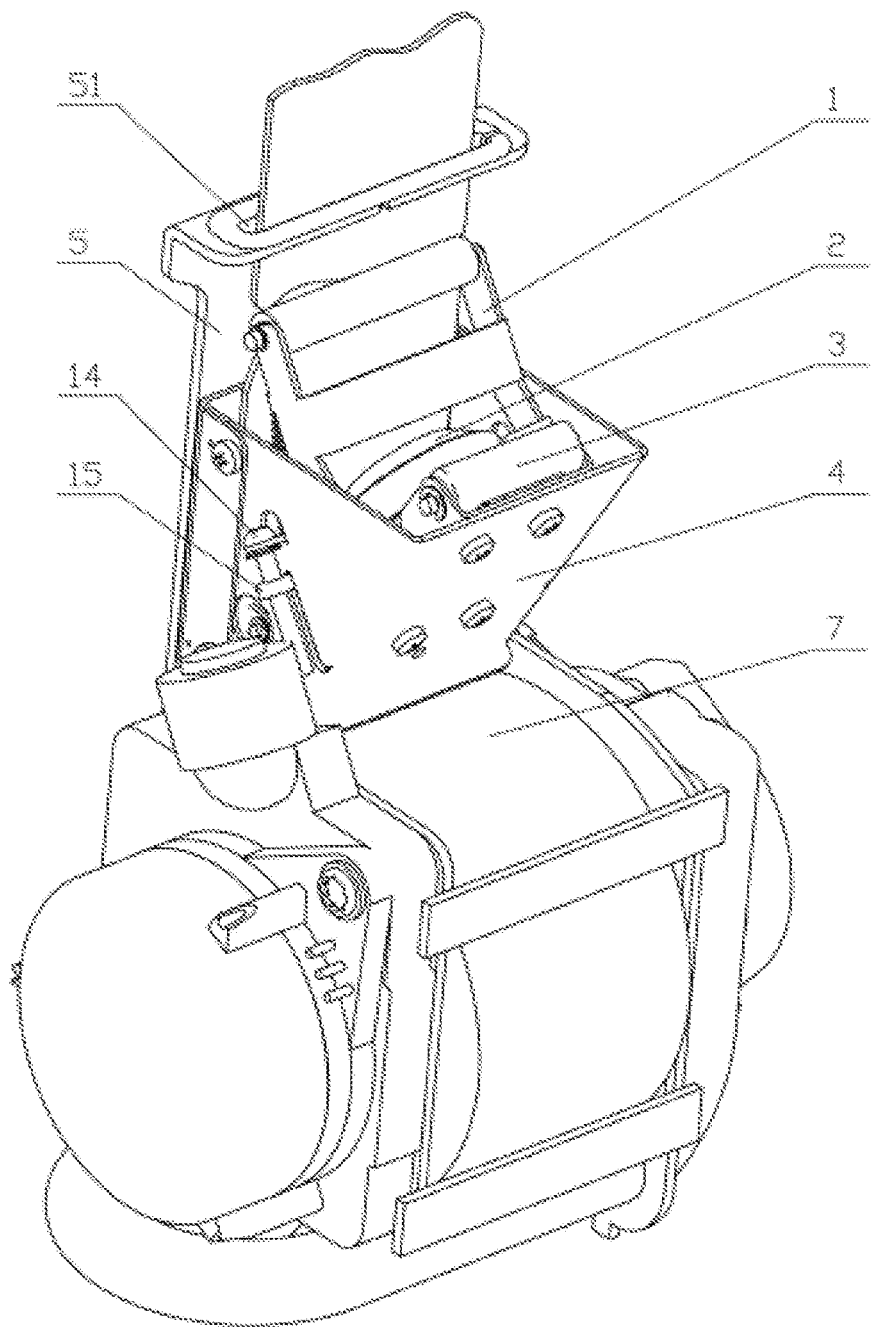
FIG. 12 is a perspective view of the vehicle seat belt adjusting device according to the present disclosure.
Figure 13:
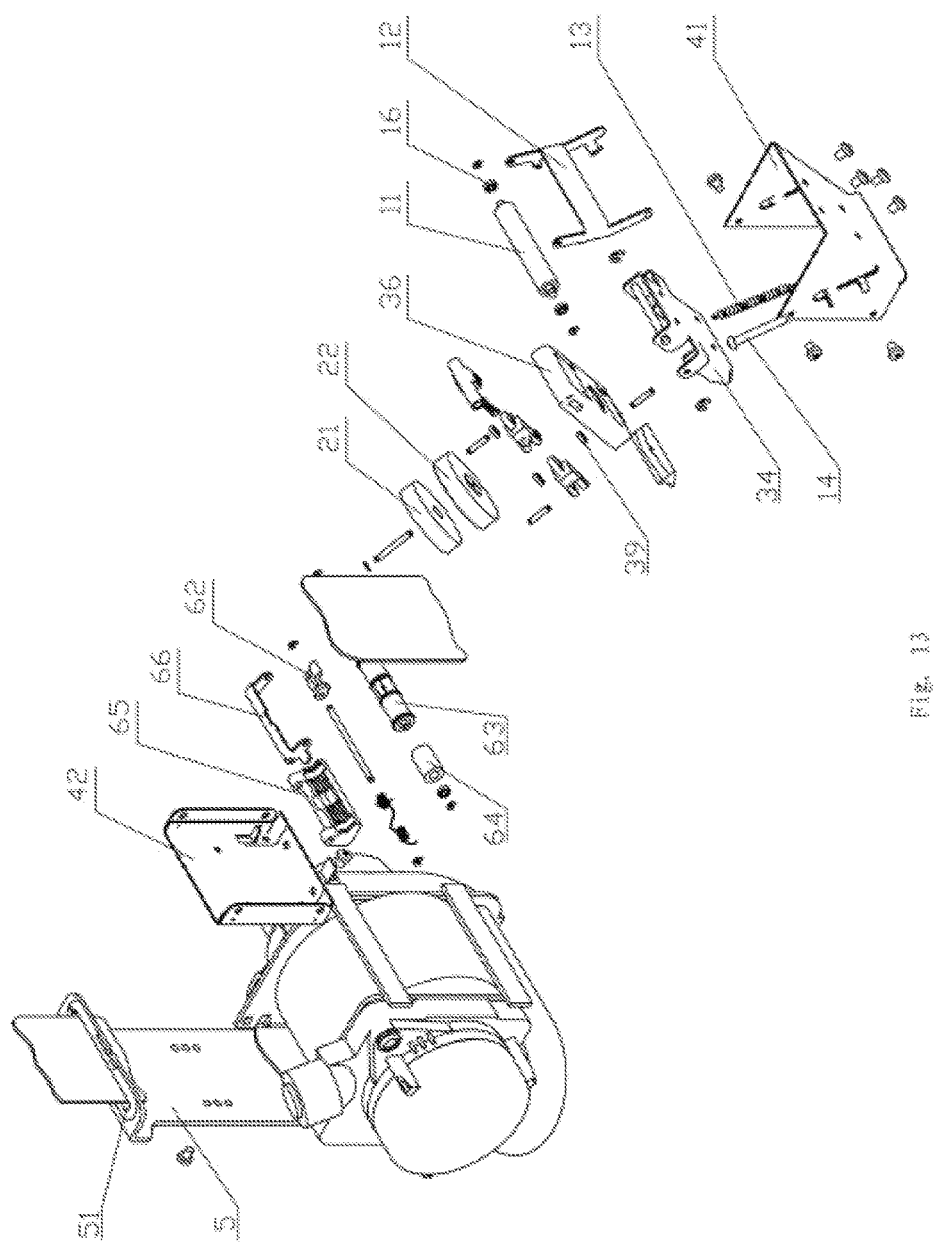
FIG. 13 is an exploded view of the adjusting device shown in FIG. 12.
Figure 14:
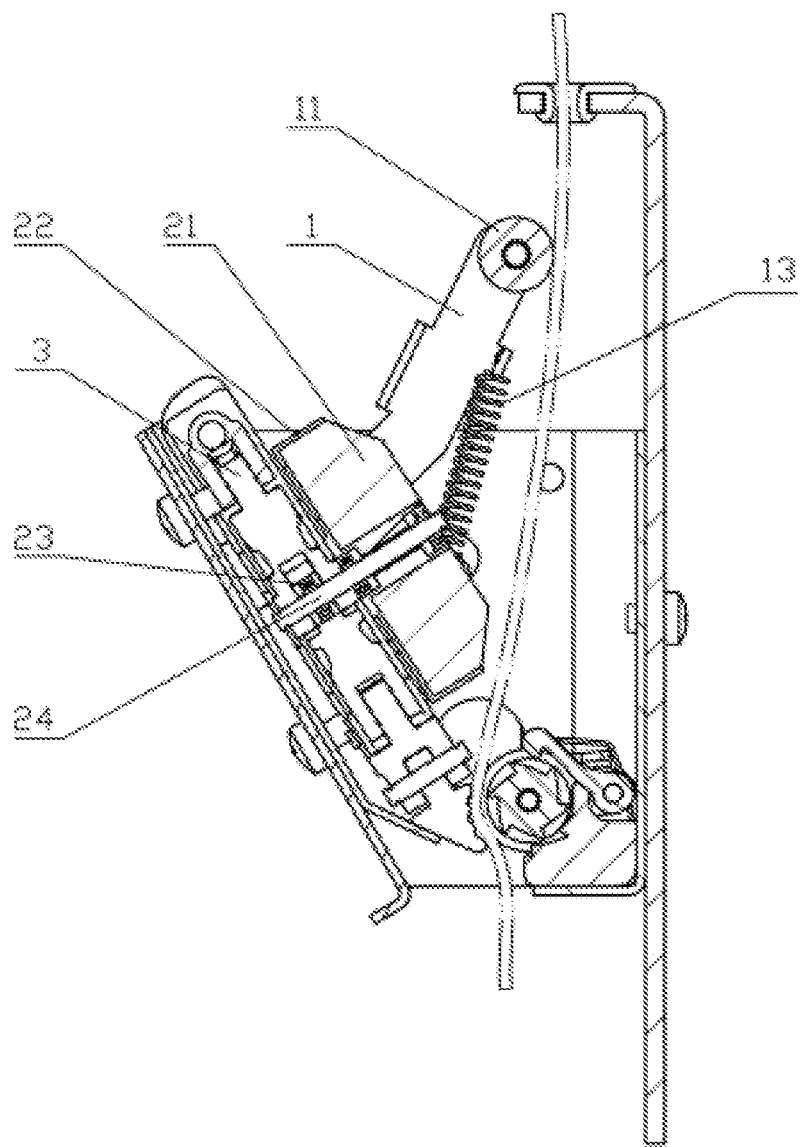
FIG. 14 is a sectional view of the adjusting device shown in FIG. 12.
Figure 16:
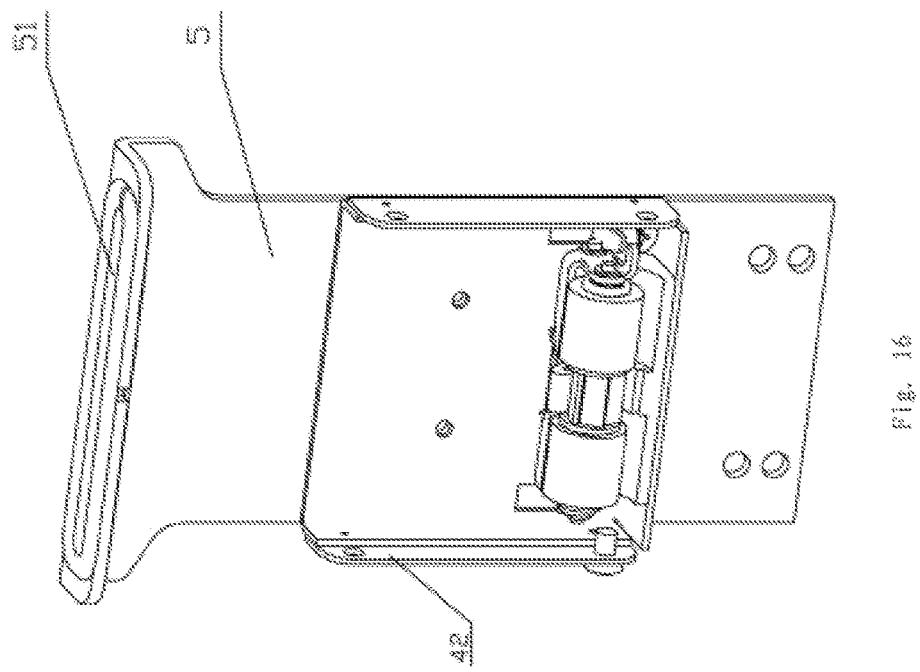
FIG. 16 is a perspective view of the back cover assembly of the adjusting device shown in FIG. 12.
Figure 15:
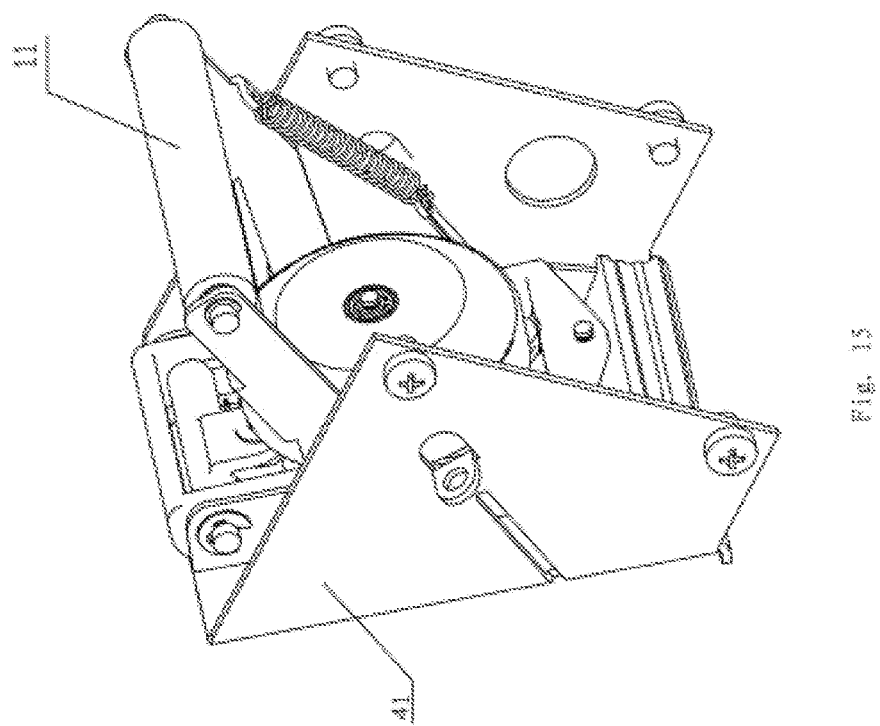
FIG. 15 is a perspective view of the front cover assembly of the adjusting device shown in FIG. 12.
Figure 17:
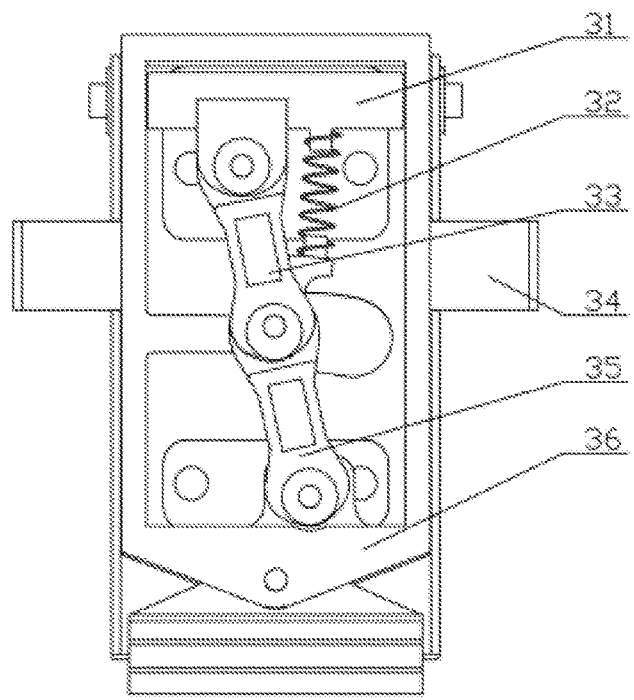
FIGS. 17 and 18 are perspective views of the pressing body in the adjusting device shown in FIG. 12, showing different states of the swing rods respectively.
Figure 18:
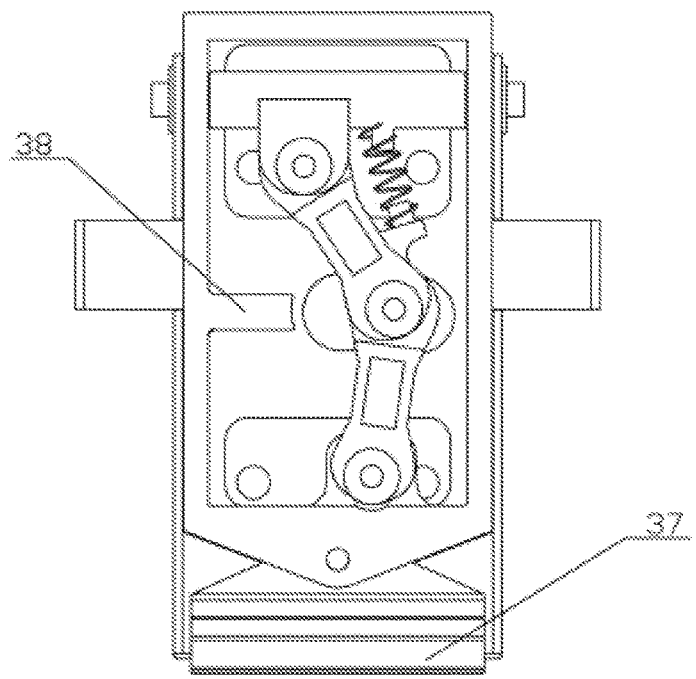

FIG. 12 is a perspective view of the adjusting device mounted on the retractor 7; FIG. 13 is an exploded view of the adjusting device; FIG. 14 is a sectional view of the adjusting device, taken along a section line passing through the hinge point between the first swing rod and the second swing rod and the ratchets of the roller shaft; FIG. 15 is a perspective view of the front cover assembly of the adjusting device; FIG. 16 is a perspective view of the back cover assembly of the adjusting device; FIGS. 17 and 18 are perspective views of the adjusting device when the swing rods are in different states.

As shown in the figures, the adjusting device in this embodiment comprises: a trigger 1, comprising a roller 11, a link bar structure 12, and a tension spring 13; an inertia weight 2; a pressing body 3; a housing 4, which serves as the supporting frame and comprises a front cover 41 and a back cover 42; a supporting plate 5, which has a slit configured to guide the path of the strap and is mounted on the retractor 7; and, a roller shaft mechanism 6.

In this embodiment, the roller shaft mechanism 6 employs the same structure as the roller shaft mechanism 6 in the first embodiment of the locking device. Hence, the structure of the roller shaft mechanism 6 will not be detailed any more in this embodiment.

Reference can be made to FIGS. 13, 14, 17 and 18 for the structure of the pressing body 3; FIGS. 19-22 show the components of the pressing body 3 respectively and separately. The pressing body 3 comprises: a first swing rod 33 and a second swing rod 35; a transverse member 31; a swing rod carriage 36 in a generally rectangular shape; a slideway 34 associated to the swing rod carriage 36; and, a pressing block 37.

The first swing rod 33 and the second swing rod 35 constitute a pair of supporting swing rods, with adjacent ends of the first and second swing rods hinged together and forming an included angle between the swing rods. The swing rod carriage 36 comprises two longitudinal walls that are generally parallel to each other, with a slotted hole in the upper end of each longitudinal wall; the upper non-adjacent end of the first swing rod 33 and second swing rod 35 is pivotally connected to the transverse member 31 (connected to the middle part of the transverse member 31 in the figure), and the lower non-adjacent end is pivotally connected to a transverse wall of the swing rod carriage 36 at the side opposite to the slotted holes. The pressing block 37 is pivotally connected to the transverse wall and works with the roller shaft to form a roller gap. The transverse member 31 comprises a main body and a pin shaft, wherein, the main body has a through-hole in its transverse direction for the pin shaft to pass through, and the two ends of the pin shaft pass through the slotted holes and are fixed to the side walls of the slideway 34 respectively. When the included angle between the first swing rod 33 and the second swing rod 35 varies, the distance between the two non-adjacent ends of the swing rods will change, and thereby the swing rod carriage 36 will carry the pressing block 37 to move to and fro in the slideway 34 along the slotted holes. The distance between the non-adjacent ends of the two swing rods is the maximum when the first swing rod 33 and the second swing rod 35 are at 180° to each other.

In the figures, the inertia weight 2 is a disk-shaped object, and is mounted on the pin shaft 24 at the hinge point between the swing rods. Of course, the inertia weight 2 can be mounted on the first swing rod or the second swing rod, and can be designed into a different shape as required. The purpose of the inertia weight 2 is to apply force to the first swing rod and/or the second swing rod and/or the hinge point between the swing rods to change the included angle between the swing rods by virtue of its great weight inertia when the vehicle is decelerated or inclines quickly, in order to relieve the force for locking the strap applied by the pressing block 37 to the strap. The purpose of the inertia weight 2 has been detailed in the PCT Application No. WO2012/026062. Preferably, as shown in FIG. 14, the inertia weight 2 comprises a main body 21 and an enclosure 22 that encloses the bottom surface and circumference of the main body 21, and the inertia weight 2 can rotate freely around its central pin shaft 24. The main body 21 can be made of a lead, steel, or other metal or alloy material, and the enclosure 22 is made of a non-metal material such as plastics or nylon, to protect the main body 21 and modify the surface of the main body 21, so as to modify the material properties of the part of the main body 21 that contacts with other parts.

In one aspect, the adjustment of the triggering sensitivity of the inertia weight 2 is accomplished by adjusting the inclination of the entire device in relation to the horizontal direction, the reliability, stability, and smoothness of the reciprocation of the swing rods on the pressing body 3 can be improved by optimizing the arrangement of the swing rods on the pressing body 3, and an optimized design of the arrangement of the swing rods on the pressing body 3 is also helpful for adjusting the triggering sensitivity of the inertia weight 2.

As shown in FIGS. 17 and 18, though the first swing rod 33 and the second swing rod 35 can be arranged to be parallel to the longitudinal axis of the pressing body when they are at 180° to each other, the two swing rods are arranged in a way that they are apparently inclined in relation to the longitudinal axis in the figures. In addition, a stop part 38 is arranged to provide excessive support to the hinge point to some degree when the first swing rod 33 and the second swing rod 35 are at 180° to each other, so that such a vertical critical state will not be destroyed by slight sways. Moreover, a compression spring 32 supported at the transverse member 31 and the hinge point is provided to actuate the first swing rod and the second swing rod to return to the 180° balanced state, and improve the reliability, stability, and smoothness of the reciprocation of the swing rods as well.

Figure 24:
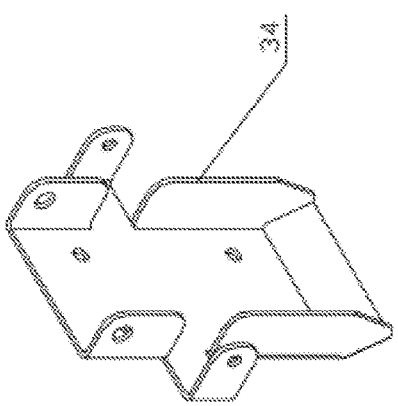
FIGS. 23 and 24 are perspective views of two different forms of slideways on the pressing body in the adjusting device.
Figure 23:
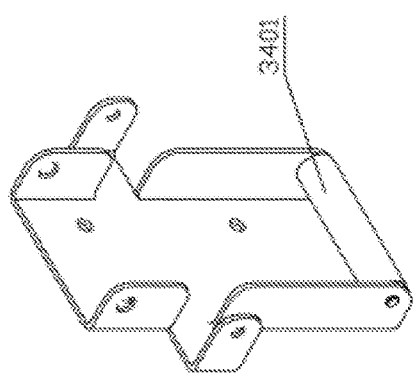

FIGS. 23 and 24 show two different forms of slideway 34. The sectional view of the pressing body in FIG. 28 shows the mounting positions of the slideway 34. The slideway 34 is made of a material with high rigidity, such as a metal material, e.g., a steel sheet; or, the slideway 34 can be made of a non-metal material with high rigidity, such as a plastic material. The lower end of the slideway 34 contacts with the back side of the pressing block 37, which is to say, the back side of the pressing block 37 slides to and fro on the lower end of the slideway 34. In FIG. 23, a roller is mounted on the lower end of the slideway 34; whereas, in FIG. 24, the lower end of the slideway 34 has a bevel face that matches the angle of the back side of the pressing block 34. In FIG. 28, the lower end of the slideway 34 has a bevel face; as shown in the figure, the angle between the principal plane P1 of the pressing body 3 (the principal plane P1 passing through the axis of the pressing body 3) and the back side of the pressing block 37 is between 15° and 40°, preferably is 30°; accordingly, the angle between the lower end of the slideway 34 and the principal plane P2 of the slideway 34 matches that angle. The reason for providing a slideway 34 and configuring the lower end of the slideway 34 to the shape described above is to enable the pressing body 34 to reciprocate more smoothly and reliably and improve the rigidity of the pressing block 37 when the pressing block 37 applies pressure to the strap 71, so that the pressing block 37 can apply force that is enough high, even close to the maximum limit that can be withstood by the material and structure.

As shown in FIG. 14, the trigger 1 is configured to trigger the movement of the inertia weight 2, so that the first swing rod 33 and the second swing rod 35 deviate from 180° and enter into an out-of-balance state, and thereby the roller gap is enlarged and the strap 71 is released by the locking device. Please see FIGS. 29A, 29B and 29C. One end of the link bar structure 12 of the trigger 1 is pivotally fixed to a support that protrudes towards both sides for the slideway, as shown in FIGS. 23 and 24, the roller 11 on the other end abuts against the strap 71, and the tension spring 13 enables the roller 11 to apply pressure determined according to the design requirement to the strap 11.

Figure 19:
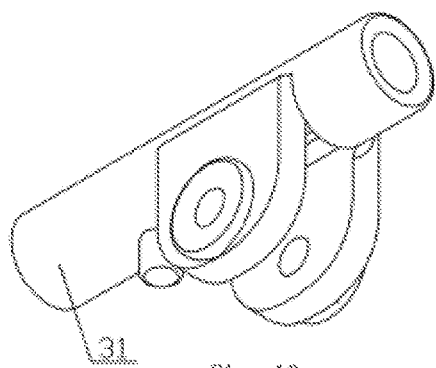
FIG. 19 is a perspective view of the main body of the transverse member configured to suspend the swing rods on the pressing body in the adjusting device.
Figure 20:
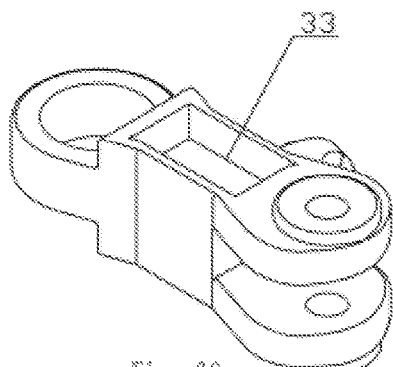
FIG. 20 is a perspective view of the first swing rod on the pressing body in the adjusting device.
Figure 21:
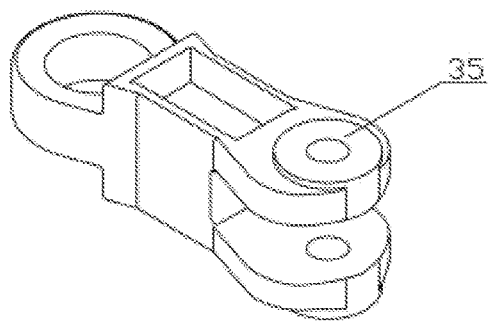
FIG. 21 is a perspective view of the second swing rod on the pressing body in the adjusting device.
Figure 22:
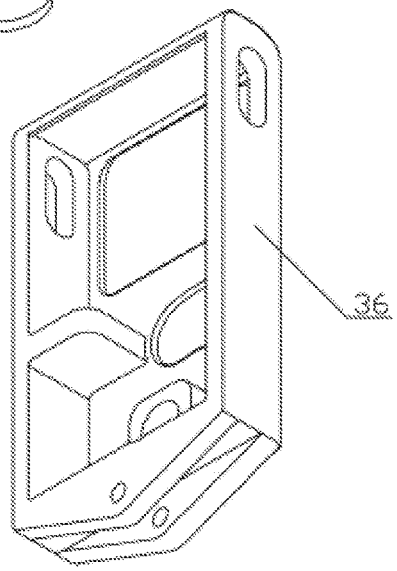
FIG. 22 is a perspective view of the swing rod carriage on the pressing body in the adjusting device.
Figure 22:
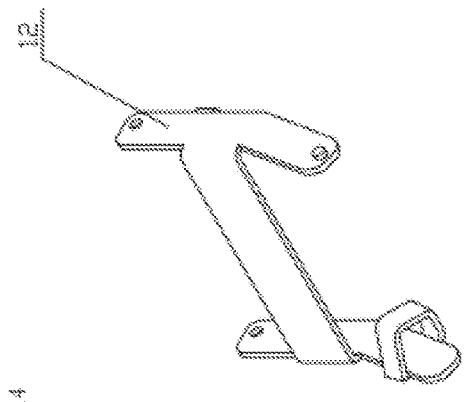

Preferably, the trigger 1 further has a pressure adjuster. As shown in FIGS. 12, 15 and 19, the pressure adjuster comprises a bolt 14 and a nut 15, wherein, the bolt 14 passes through the hole of a fixing lug arranged on the front cover 41 and is supported on the lug, the connecting part of the nut 15 passes through a slot in the front cover 41 and is connected to one end of the tension spring 13, and, by turning the bolt 14, the nut 15 can be driven to move along the slot, so that the preloaded pressure applied by the tension spring 13 can be adjusted.

Figure 26:
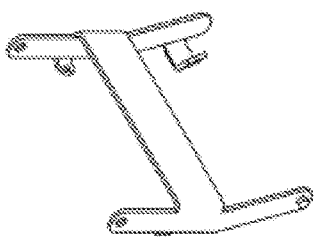
Figure 25:
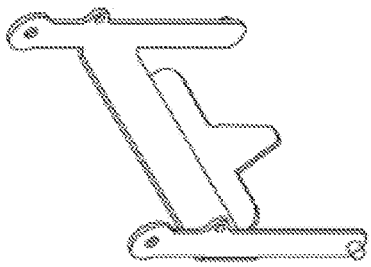
Figure 29:
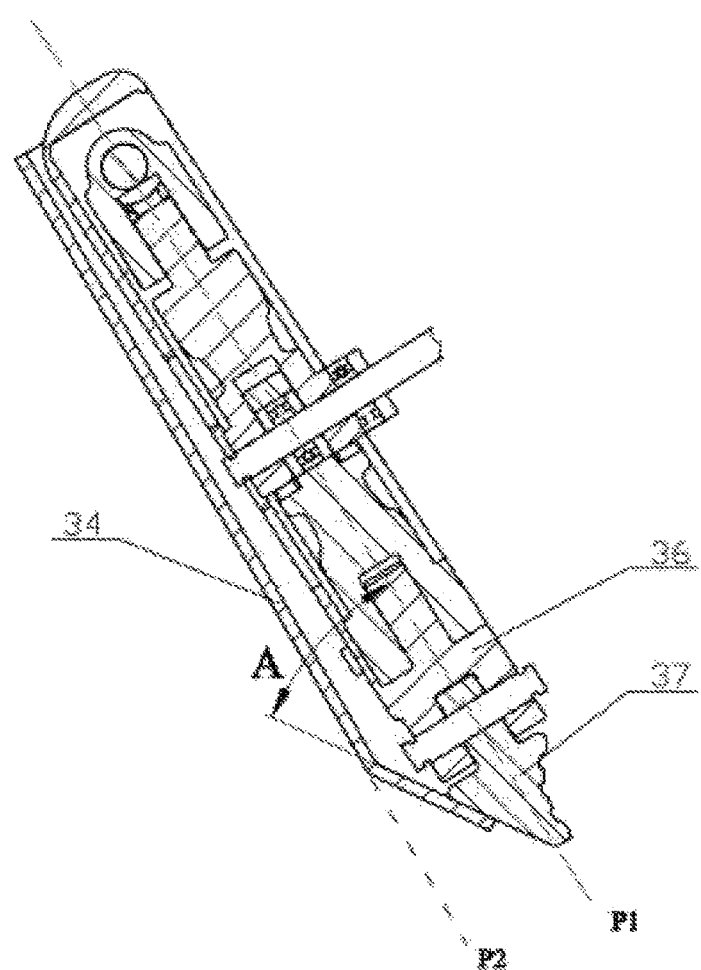
FIGS. 29A, 29B and 29C are perspective views showing the contact between the three different forms of link bar structures and the inertia weight.

The link bar structure 12 pushes the inertia weight 2 via a protrusion that protrudes towards the inertia weight 2. FIGS. 29A, 29B and 29C show different forms of pushing mechanisms used by the link bar structure 12 to push the inertia weight 2; FIGS. 25-26 show separate link bar structures 12 with different protrusions. As shown in the figures, the protrusion can be in a plate shape as shown in FIG. 25, or in a generally box shape as shown in FIG. 27, or in a wedge shape as shown in FIG. 25. Preferably, the plate-shaped protrusion and the generally box-shaped protrusion contact with the circumferential edge of the inertia weight 2 when they push the inertia weight 2, while the wedge-shaped protrusion contacts with the pin shaft configured to fix the inertia weight 2 when it pushes the inertia weight 2. The generally box-shaped protrusion has higher rigidity, is more resistant to deformation, and contacts with the inertia weight 2 more stably, which is beneficial for accurately controlling the operation of the adjusting device disclosed in the present disclosure.

Preferably, the main body of roller shaft 63, pressing block 37, carriage 36, swing rods 33 and 35, transverse member 31, and roller 11 are made of nylon or plastics, such as ABS resin.

Figure 7:
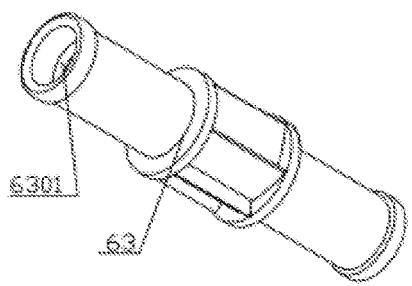
FIG. 7 is a perspective view of the main body of the roller shaft.
Figure 8:
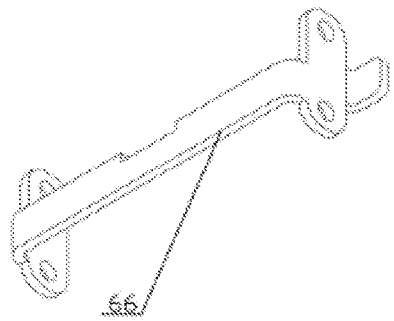
FIG. 8 is a perspective view of the roller shaft bracket.

Preferably, roller bearings, such as roller bearings 69, 39 and 16, are provided at the rotary supporting parts of the roller shaft, roller 11, inertia weight 2, and pressing body 3, etc., to ensure that they rotate smoothly and stably. For example, as shown in FIG. 14, roller bearings are provided at the upper and lower ports of the pin shaft hole in the main body of inertia weight 21, respectively. As shown in FIGS. 2A, 4 and 7, counter bores 6301 are provided at the two ends of the shaft hole of the main body of roller shaft 63 to receive a roller bearing 69 respectively.

FIGS. 12 and 14 are perspective view and sectional view of the assembled adjusting device respectively. In this embodiment, when the user pulls the strap 71, the roller shaft with a frictional surface 64 can pivot upwards easily and thereby the roller gap between the pressing block 36 and the roller shaft can be enlarged, because the strap 71 applies pressure to the roller shaft as it moves upwards. The roller gap will never restrain the strap 71 when the strap 71 is pulled, regardless of the angle between the swing rods on the pressing body 3; moreover, the roller shaft can always rotate in the process the strap is pulled, because the roller shaft rotates in a direction that doesn't result in engagement between the pawl 62 and the ratchets 6301 on the roller shaft. In addition, the strap pulled out from the retractor 7 will be in a tensioned state because the pulling force acts in a direction reversed to the direction of the retracting force of the retractor 7. In that state, the roller 11 of the trigger abuts against the surface of the strap 71 and applies pressure on the strap under the action of the tension spring 13.

Once the user stops pulling, the roller shaft will engage with the pawl 62 and thereby stop rotation instantaneously because it is subjected to reversing force incurred by the retracting force of the retractor 7 and the friction force between the strap 71 and the frictional surface 64. In addition, the roller shaft and the supporting rod of roller shaft 66 will pivot downwards mainly owing to the downward friction force; consequently, the roller gap will become smaller and smaller, till the two sides of the strap 71 are subject to the pressure from the roller shaft and the front side of the pressing block. In that state, the first swing rod 33 and the second swing rod 35 are still in the 180° aligned state. The trigger 1 applies certain pressure to the strap 71 owing to the tension force from the tension spring 13, and gradually pivots downwards towards the back cover 42 and the supporting plate 5 while pressing the strap 71. As the trigger 1 pivots downwards gradually, the tension force from the tension spring 13 reduces gradually. Before the protrusion of the link bar structure 12 on the trigger 1 pushes the inertia weight and thereby forces the swing rods to enter into an out-of-balance state, the pressure applied by the pressing block 37 and the frictional surface 64 of the roller shaft to the strap 71 will clamp and lock up the strap 71.

Those skilled in the art can design the magnitude of the pressure applied by the trigger 1 to the strap 71 as required, and can design the protrusion of the link bar structure 12 as required so as to define the specific state of the trigger 1 when the swing rods are driven to enter into an out-of-balance state.

The adjusting device in this embodiment can be adjusted so that, once the user pulls out the strap 71 to a long length, for example, the length of the strap 71 after the seat belt is buckled into the buckle lock 9 is longer than the length required to fastening the strap 71 rightly on the body of the user by 10-60 cm, the trigger 1 will pivot downwards all the way till the protrusion of the link bar structure 12 pushes the inertia weight 2 and drive the hinge point between the swing rods to move, so that the first swing rod 33 and the second swing rod 35 are out of balance and bent; thus, the pressing block 37 will be retracted, the adjusting device will transit from the locking state in which the strap 71 is clamped and locked to a release state in which the strap 71 is released, and thereby the strap 71 will be retracted under the retracting force of the retractor 7. In addition, the retracting force applied to the strap 71 will have an act on the pressing block 37. Hence, in the retracting process of the strap 71, the strap 71 will press the pressing block 37 and thereby keep the first swing rod 33 and the second swing rod 35 in the bent state.

The adjusting device in this embodiment can be adjusted so that, when the user pulls out the strap 71 to a short length, for example, the length of the strap 71 pulled out by the user after the seat belt is buckled into the buckle lock 9 is longer than the length required for fastening the strap 71 rightly on the body of the user by 10-60 cm, the roller 11 on the trigger 1 will stay on the strap 71, and the protrusion of the link bar structure 12 will contact with the inertia weight 2 but will not push the inertia weight 2 to drive the first swing rod 33 and the second swing rod 35 into an out-of-balance state.

The triggering force of the trigger 1 depends on several factors of the structure disclosed in the present disclosure, including: the tension force of the tension spring 13; the shape and position of the protrusion of the link bar structure 12; the position of contact between the inertia weight 2 and the protrusion of the link bar structure 12; the angle between the contact part of the inertia weight 2 and the contact part of the protrusion of the link bar structure 12; and, the degree of excessive support for the first swing rod 33 and the second swing rod 35, i.e., the resistance to loss of stability of the first swing rod 33 and the second swing rod 35.

On the contrary, when the strap 71 is retracted, the strap 71 is subjected to the weight of the strap portion that has been pulled out and the friction forces applied to the strap 71 by the parts contacting with the strap 71, besides the retracting force of the retractor 7. The adjusting device disclosed in the present disclosure can utilize the above-mentioned friction forces to fine-tune the triggering of the trigger 1. In the embodiments of the present disclosure, among the friction forces, the friction force between the suspender 8 and the strap 71 is the principal one, which depends on the softness and weight of the strap 71. As the pulled-out length of the strap 1 varies, the contact angle, contact area, and contact pressure between the strap 1 and the suspender 8 will vary, and thereby the magnitude of the friction force will vary finely. When the strap 1 is pulled out to a longer length, the friction force between the suspender 8 and the strap 71 will be slightly lower; when the strap 1 is pulled out to a shorter length, the friction force between the suspender 8 and the strap 71 will be slightly higher. Though the magnitude variation of the friction force is very slight, it is proven that the magnitude variation is enough to be used to fine-tune the triggering of the trigger 1. As described above, the final fine-tuned triggering force of the trigger 1 can be obtained by utilizing the factors that have influences on the triggering force in combination. Thus, the embodiments of the present disclosure can utilize the above-mentioned friction forces to fine-tune the triggering of the trigger 1, so that the trigger 1 will trigger the first and second swing rods 33 and 35 to enter into an out-of-balance state and thereby the strap 71 is retracted in the case that the strap 71 is pulled out to a long length, while the protrusion of the link bar structure 12 on the trigger 1 will contact with the inertia weight 2 but will not trigger the first and second swing rods 33 and 35 to enter into an out-of-balance state in the case the strap 71 is pulled out to a short length.

By adjusting the triggering force of the trigger 1, preferably, the trigger will not trigger the first and second swing rods 33 and 35 to enter into an out-of-balance state while rendering the user a sense of 0-0.1 lb pressure when the strap is pulled out to a short length, i.e., the strap is in a rightly slack state, which is to say, the adjusting device disclosed in the present disclosure can render the user a "sense of zero pressure" of the seat belt when the strap is pulled out to a short length, i.e., the strap is in a rightly slack state.

If the trigger 1 is restricted manually from abutting against the inertia weight 2 or the trigger 1 is omitted, the strap 71 will be clamped and locked by the pressing block 37 and the roller shaft once the user stops pulling the strap 71 after he/she pulls out the strap 71; consequently, the strap 71 can't be retracted, unless the swing rods are driven manually or driven by the inertia weight 2 automatically to enter into an out-of-balance state.

After the adjusting device disclosed in the present disclosure locks up the strap 71, if the vehicle is decelerated rapidly, the inertia weight 2 will rush forwards under the inertia effect. Hence, it will drive the first and second swing rods 33 and 35 to exit the balanced state, and the pressing block 37 will be retracted along the slideway 34; thus, the strap 71 will be released from the roller gap and retracted quickly under the retracting force of the retractor 7. Of course, the triggering sensitivity of the inertia weight 2, in other words, the exact level of rapid deceleration of the vehicle at which the inertia weight 2 triggers the first and second swing rods 33 and 35 to exit the balanced state, can be determined by adjusting the inclination of the inertia weight 2 in overall and designing the arrangement of the swing rods on the pressing body 3 specifically.

In the case of vehement deceleration, i.e., in a collision accident, not only will the inertia weight 2 drive the first and second swing rods 33 and 35 to get out of balance, but also the roller gap will release the strap 71, and the retractor 7 will quickly lock up the strap 71, so that the seat belt can protect the user. If the pull-out portion of the strap 71 is too long, the retractor 7 may retract the strap for a length before it can lock up the strap.

Figure 31:
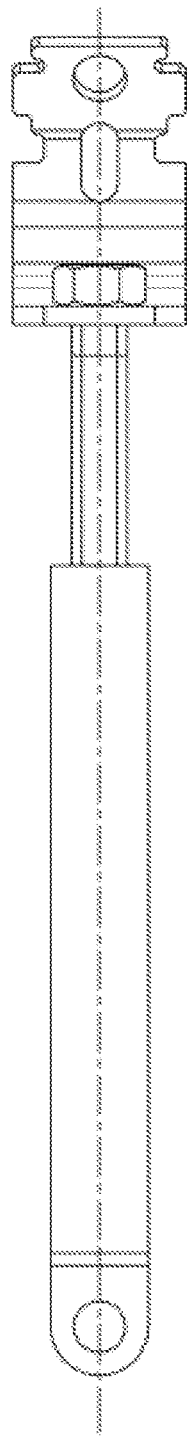
FIG. 31 is a front view of the elastic compression element.
Figure 32:
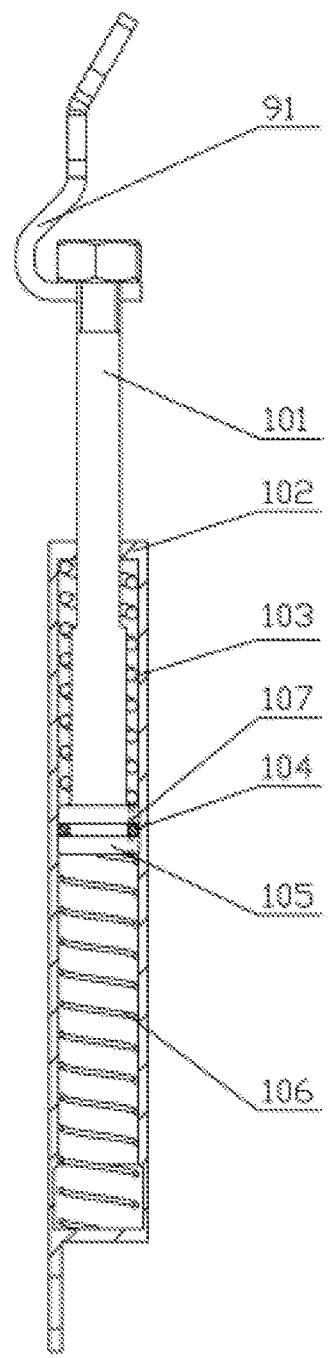
FIG. 32 is a sectional view of the elastic compression element.

As for a seat belt with the adjusting device disclosed in the present disclosure, if the length of the strap 71 has to be controlled solely by the user by pulling the strap 71 to realize locking of the strap 71 of the seat belt as described in the above embodiment, the user has to focus his/her mind to do that, though the operation is easy. Hence, the adjusting device disclosed in the present disclosure may further comprise an elastic compression element 10, in order to enable the user to use the seat belt with the adjusting device disclosed in the present disclosure more conveniently, control the slack length of the strap 71 quantitatively, and simplify and routinize the operation of the seat belt provided in the present disclosure. FIG. 10 shows the mounting position of the elastic compression element 10 in an embodiment of the present disclosure schematically; FIGS. 31 and 32 show a front view and a sectional view of the elastic compression element 10 respectively.

Preferably, the elastic compression element 10 is fixedly connected with the buckle lock 9, or is integrated with the buckle lock 9 into an assembly. In FIG. 11, the elastic compression element 10 is disposed on the lower part of the buckle lock 9 and is connected to the main body of the vehicle or the main body of the seat; alternatively, the elastic compression element 10 can be a part of the buckle 92 or a part of the lock body 91.

As shown in FIGS. 31 and 32, the elastic compression element 10 comprises: a connecting rod 101, fixedly connected to the lock body 91; a housing 102, wherein, the connecting rod 101 passes through a hole in the front end of the housing 102 and is received in the housing 102; and, a compression spring 106, wherein, the lower end of the connecting rod 101 abuts against the compression spring 106. In the elastic compression element 10, the compression length of the compression spring 106 can be selected within a range of 10-60 cm, preferably is 40 cm, for example.

After the user places the strap 71 rightly on his/her body and buckles the strap 71 into the buckle lock 9, or after the strap 71 is retracted by the retractor 7 and buckled into the buckle lock 9 in the case that the strap 71 is pulled out too long, when the user presses the buckle lock 9 again, the compression spring 106 in the elastic compression element 10 fixedly connected to the buckle lock 9 will be compressed, and thereby the strap 71 will be pulled out further from the retractors by a short length, e.g., 40 cm. As described above, after the strap 71 is pull out further by the short length, the adjusting device disclosed in the present disclosure will not cause the trigger 1 to trigger the swing rods on the pressing body 3 to get out of balance, while the roller gap clamps the strap 71 firmly so that the strap 71 can't be retracted. Thus, the strap 71 tied on the body of the user is slack, and the user doesn't feel any pressure from the strap 71 at all, unlike in the case of seat belts in the prior art, which give the user a strong sense of pressure.

Though a compression spring 106 is used to control the length of the strap 71 pulled out further as shown in the figures, those skilled in the art can easily understand that a tension spring can be utilized to work with the connecting rod 101, and such a scheme is easy to design and implement, as long as the connecting rod 101 can be pressed downwards and then reset automatically.

Preferably, the elastic compression element 10 may further comprise a sealing element 104, such as a seal ring. The sealing element 104 attains a sealing effect between the outer wall of a tail stop part 105 of the connecting rod 101 and the inner wall of the housing 102. In addition, the tail stop part 105 has a through-hole 107, the diameter of which can be 0.3-1 mm, e.g., 0.4 mm. Thus, the space configured to contain the compression spring 105 in the housing 102 becomes a space that utilize the through-hole 107 solely to vent to the ambient environment. Therefore, after the connecting rod 101 is pressed down, the connecting rod 101 will not bounce back quickly, but will only rise up slowly, even though there is a spring 105. By controlling the movement of the connecting rod 107 in such a way, the connecting rod 101 will not bounce back quickly after it is pressed down. Thus, the adverse effect of quick upward bouncing of the connecting rod 101 to the position and state of the strap 71 can be avoided, and thereby the impact on the operation of the trigger 1 can be avoided.

In the above embodiment, the through-hole is arranged at the tail stop part 105. Alternatively, the through-hole 107 can be arranged at any other part, as long as the above-mentioned technical effect can be attained, regardless whether a compression spring or a tension spring is used; for example, the through-hole 107 can be arranged on a wall of the housing 102.

Moreover, as an optional configuration, as shown in FIG. 32, the elastic compression element 10 may further comprise a damping spring 103, which enables the elastic compression element 10 to be elongated in a damped manner when the strap 71 is subjected to great tension force from the body of the user, to buffer the impact between the body and the strap 71, and thereby avoid the physical injuries of the user resulted from the strap itself, i.e., mitigate or even avoid the so-called "secondary damage" from the seat belt, while ensuring the protective function of the seat belt. The damping spring 103 can be arranged together with the compression spring 106 in the elastic compression element 10; alternatively, a damped elongation element comprising the damping spring 103 can be provided separately. In the structure shown in FIG. 32, if the damping spring 103 is not provided, the connecting rod 101 should be configured so that it is restricted by the housing 102 from moving upwards before it is pressed downwards.

In the structure shown in FIG. 32, the damping spring 103 is a compression spring. Apparently, those skilled in the art can design the damping spring 103 as a tension spring according to its purpose, as long as the damping spring 103 can be connected to the tail part of the connecting rod 101 so that the connecting rod 101 can elongate the damping spring 103 when the connecting rod 101 is subjected to tension force.

As for the specific configuration of the spring 105, damping spring 103, and connecting rod 101, those skilled in the art can design appropriately according to the purposes of the spring 105 and damping spring 103. The configuration shown in the figures and described in the above embodiment is only exemplary. The principle of realizing reset after compression and a buffer effect by virtue of damped elongation with a connecting rod and a spring is not complex, the specific structural design can be obtained by making modifications, combinations, and replacements to the drawings and above embodiments based on different structures in the prior art, and the structure is not complex. Therefore, various variations can be made by those skilled in the art based on the above teachings without creative labor.

Of course, in the seat belt disclosed in the present disclosure, not only can the damped elongation element comprising the damping spring 103 be provided, but also other forms of damped elongation elements can be provided to mitigate or even avoid "secondary damages", and such damped elongation elements can be provided in any appropriate components of the seat belt as required, such as the buckle lock or suspender, or can even be a part of the strap directly, as long as the damped elongation elements can be elongated in a damped manner when they are subjected to great tension force from the body of the user.

Thus, it can be seen from the above description: a seat belt with the adjusting device described above in the present disclosure can be operated simply and routinely as follows:

1. Pull the strap, and buckle up the strap into the buckle lock; thus, the strap will be retracted appropriately if the pulled-out portion is too long;

2. Press down the buckle lock, so that the strap is further pulled out by a small length.

Through the simple operation described above, it is easy to render the user a sense of zero pressure of the seat belt on the body, while the seat belt protects the user safely without any potential safety risk.

To make the adjusting device disclosed in the present disclosure more reliable and more convenient to use, the inventor further puts forward an improved design of the coil spring in the retractor. In the retractors in the prior art, the elasticity of the coil spring is variable. Specifically, the longer the strap is pulled out, the higher the retracting force is. However, such a property of the retractor actually is adverse to reliable and convenient operation, installation, and manufacturing of the adjusting device disclosed in the present disclosure. For the present disclosure, if the retracting force is essentially constant no matter how long the strap is pulled out, it will be easier to operate, install, and manufacture the adjusting device disclosed in the present disclosure. Hence, the inventor puts forward a coil spring with a variable cross section, i.e., the coil plate of the coil spring has a variable cross section, so that the retracting force is essentially constant, regardless of the amount of deformation of the coil spring.

Figure 30:
FIG. 30 is a schematic stretched-out view of the coil spring in the retractor.

The coil plate with a variable cross section in the coil spring may have the same thickness but gradually reduced width along the longitudinal direction; or, the coil plate has the same width but gradually reduced thickness along the longitudinal direction. A coil plate with gradually reduced width is shown in FIG. 30 schematically. As shown in the figure, the extended coil plate has gradually reduced width from its left end to its right end.

The adjusting device in the above embodiment is described exemplarily in the case of an adjusting device mounted on the right side of a vehicle seat. For example, the protrusion of the link bar structure 12 shown in the figures is at a position only suitable for an adjusting device mounted on the right side of a vehicle seat, and the stop part 38 of the carriage 36 is only suitable for an adjusting device mounted on the right side. The adjusting device can be configured into a left adjusting device or right adjusting device accordingly, depending on whether the adjusting device is mounted at the left side of the vehicle seat or at the right side of the vehicle seat.

Through reading the above description of some embodiments of the adjusting device disclosed in the present disclosure, those skilled in the art should appreciate that the adjusting device disclosed in the present disclosure can utilize swing rod force that is infinitely great theoretically to lock up the strap, and can unlock easily and automatically in response to a signal of low force as well, rendering the user a "sense of zero pressure" of the seat belt on the body; in addition, the adjusting device is agile and reliable in operation, and the seat belt disclosed in the present disclosure is easy and simple to use, and can be operated routinely.

While the locking device, adjusting device, and seat belt disclosed in the present disclosure are described above exemplarily, the specific features of the locking device, adjusting device, and seat belt disclosed in the present disclosure, such as shape and dimensions, can be designed specifically based on the functions of the features disclosed above, and all such designs can be envisaged and implemented by those skilled in the art easily. In addition, those skilled in the art can combine the features disclosed above in different embodiments in the same embodiment and make modifications to them, or make combinations and modifications to the features across different embodiments, as long as the objects of the present disclosure can be attained. The scope of protection of the present disclosure is only confined by the attached claims. A locking device for controlling a moveable chain object, a moveable strip object, or a moveable belt object, comprising:

The invention claimed is:

1. A locking device for controlling a moveable chain object, a moveable strip object, or a moveable belt object, comprising:
   a supporting frame for mounting purposes;
   a roller shaft comprising:
      one or more first ratchets; and
      a frictional surface or a sprocket pitch groove along at least a part of a length of the roller shaft in an axial direction of an axis of the roller shaft;
      wherein the roller shaft can rotate around the axis of the roller shaft and is fixedly connected with a supporting rod, and one end of the supporting rod is pivotally connected to the supporting frame;
   a pawl disposed above the roller shaft and capable of pivoting around one end of the pawl; and
   a pressing body opposite the roller shaft in a transverse direction, wherein a roller gap through which the moveable chain object, the moveable strip object, or the moveable belt object can pass is formed between the roller shaft and the pressing body, and the pressing body is moveable so as to apply a force to the moveable chain object, the moveable strip object or the moveable belt object,
   wherein,
      when the roller shaft is in a neutral state in which the roller shaft is not subject to a pressure from the pressing body and a pressure from the moveable chain object, the moveable strip object, or the moveable belt object, the roller shaft can rotate;
      when the moveable chain object, the moveable strip object, or the moveable belt object moves downwards and the pressing body applies the force from the pressing body against the moveable chain object, the moveable strip object, or the moveable belt object and thereby applies the pressure from the pressing body and the pressure from the moveable chain object, the moveable strip object, or the moveable belt object to the roller shaft, the roller shaft is arranged to pivot downwards along with the supporting rod, until one or more second ratchets of a contact base arranged on the supporting frame engage with the one or more first ratchets of the roller shaft and thereby restrain a rotation of the roller shaft, so that the moveable chain object, the moveable strip object, or the moveable belt object is clamped and locked;
      when the moveable chain object, the moveable strip object, or the moveable belt object moves upwards and the pressing body releases the moveable chain object, the moveable strip object, or the moveable belt object, the roller shaft is arranged to pivot upwards along with the supporting rod, until the one or more first ratchets of the roller shaft abut against the pawl; and
      when the moveable chain object, the moveable strip object, or the moveable belt object changes to move downwards, the pawl is arranged to engage with the one or more first ratchets of the roller shaft and thereby restrain the rotation of the roller shaft, and the pawl will pivot downwards along with the roller shaft and thereby further disengage from the one or more first ratchets of the roller shaft.

2. An adjusting device for a seat belt for use in a vehicle, comprising:
   a supporting frame for mounting purposes;
   a roller shaft comprising:
      one or more first ratchets; and
      a frictional surface along at least a part of a length of the roller shaft in an axial direction of an axis of the roller shaft;
      wherein the roller shaft is arranged to rotate around the axis of the roller shaft and is fixedly connected with a supporting rod, and one end of the supporting rod is pivotally connected to the supporting frame;

a pawl disposed above the roller shaft;

a pressing body comprising a first supporting swing rod and a second supporting swing rod, wherein adjacent ends of the first supporting swing rod and the second supporting swing rod are hinged together and form an included angle between the first supporting swing rod and the second supporting swing rod, a non-adjacent end of one of the first supporting swing rod or the second supporting swing rod is stationary, while a non-adjacent end of an other one of the first supporting swing rod or the second supporting swing rod moves as the included angle between the first supporting swing rod and the second supporting swing rod varies, and the pressing body is opposite to the roller shaft in a transverse direction, and a roller gap through which a strap of the seat belt can pass is formed between the roller shaft and the non-adjacent end of the other one of the first supporting swing rod or the second supporting swing rod; and an actuator arranged to change the included angle between the first supporting swing rod and the second supporting swing rod by applying a first force to at least one of the first supporting swing rod, the second supporting swing rod, or a hinge point between the first supporting swing rod and the second supporting swing rod, to relieve a second force for locking the strap of the seat belt applied by the non-adjacent end of the other one of the first supporting swing rod or the second supporting swing rod to the strap of the seat belt;

wherein:

when the first supporting swing rod and the second supporting swing rod are in a 180° vertically aligned state, the non-adjacent end of the other one of the first supporting swing rod or the second supporting swing rod is arranged to minimize the roller gap and apply the second force of the non-adjacent end of the other one of the first supporting swing rod and the second supporting swing rod on the strap of the seat belt, so as to clamp the strap of the seat belt and lock the strap of the seat belt;

when the included angle between the first supporting swing rod and the second supporting swing rod is changed via the actuator in response to a signal of low force, the non-adjacent end of the other one of the first supporting swing rod or the second supporting swing rod can release the strap of the seat belt;

when the roller shaft is in a neutral state in which the roller shaft is not subject to a pressure from the pressing body and a pressure from the strap of the seat belt, the roller shaft is arranged to rotate;

when the strap of the seat belt moves downwards under action of a retractor and the non-adjacent end of the other one of the first supporting swing rod or the second supporting swing rod applies the second force of the non-adjacent end of the other one of the first supporting swing rod or the second supporting swing rod against the strap and thereby applies the pressure of the pressing body and the pressure of the strap of the seat belt to the roller shaft, the roller shaft is arranged to pivot downwards along with the supporting rod, until one or more second ratchets of a contact base arranged of the supporting frame engage with the one or more first ratchets of the roller shaft and thereby restrain a rotation of the roller shaft, so that the strap of the seat belt is clamped and locked;

when the strap of the seat belt is pulled to move upwards and the non-adjacent end of the other one of the first supporting swing rod or the second supporting swing rod releases the strap of the seat belt, the roller shaft is arranged to pivot upwards along with the supporting rod, until a first ratchet of the one or more first ratchets of the roller shaft abuts against the pawl that is disposed above the roller shaft and can rotate around the axis of the roller shaft; and when the strap of the seat belt changes to move downwards under the action of the retractor, the pawl will engage with a second ratchet of the one or more first ratchets of the roller shaft and thereby restrain the rotation of the roller shaft, and will pivot downwards along with the roller shaft and thereby further disengage from the second ratchet of the one or more first ratchets of the roller shaft.

3. The adjusting device according to claim 2, wherein:

the actuator is an inertia weight mounted on the at least one of the first supporting swing rod, the second supporting swing rod, or the hinge point between the first supporting swing rod and the second supporting swing rod; and the inertia weight is a disk-shaped object.

4. The adjusting device according to claim 2, further comprising a trigger configured to trigger the actuator, wherein, the trigger actuates the first supporting swing rod and the second supporting swing rod to deviate from the 180° vertically aligned state and thereby enter into an out-of-balance state.

5. The adjusting device according to claim 2, wherein a tip portion of the non-adjacent end of the other one of the first supporting swing rod or the second supporting swing rod opposite to the roller shaft is arc-shaped so that the tip portion assists the roller shaft to accomplish upward or downward pivoting or locking actions.

6. The adjusting device according to claim 2, wherein the pawl has an elastic member which applies preloaded downward pressure on the pawl.

7. The adjusting device according to claim 2, further comprising a slit configured to guide the strap of the seat belt, wherein the slit is spaced from the roller gap and is arranged above the roller gap so that the strap of the seat belt can move along a path between the slit and the roller gap.

8. The adjusting device according to claim 2, wherein:

a principal plane of the pressing body that comprises the first supporting swing rod and the second supporting swing rod is at an angle between 10° and 80° from a horizontal plane; and the non-adjacent end of the other one of the first supporting swing rod or the second supporting swing rod is close to the roller shaft, so that the roller gap is reduced when the first supporting swing rod and the second supporting swing rod approach an angle of 180°.

9. The adjusting device according to claim 2, wherein:

the pressing body further comprises a generally rectangular swing rod carriage, a pressing block, and a transverse member;

the generally rectangular swing rod carriage comprises two longitudinal walls that are generally parallel to each other, with slotted holes arranged in upper ends of the two longitudinal walls;

the non-adjacent end of the one of the first supporting swing rod or the second supporting swing rod is pivotally connected to the transverse member, and the non-adjacent end of the other one of the first supporting swing rod or the second supporting swing rod is pivotally connected to a transverse wall of the generally rectangular swing rod carriage at a side of the transverse wall farther from the slotted holes arranged in the upper ends of the two longitudinal walls;

the pressing block is pivotally connected to the transverse wall and works with the roller shaft to form the roller gap;

two ends of the transverse member pass through the slotted holes arranged in the upper ends of the two longitudinal walls and are fixed to the supporting frame respectively, so that the generally rectangular swing rod carriage carries the pressing block to move along the slotted holes arranged in the upper ends of the two longitudinal walls when the included angle between the first supporting swing rod and the second supporting swing rod varies; and the pressing body further comprises an elastic member that is disposed on the generally rectangular swing rod carriage and configured to actuate the first supporting swing rod and the second supporting swing rod to return to the 180° vertically aligned state.

10. The adjusting device according to claim 9, wherein:

the pressing body further comprises a slideway, which is mounted on the supporting frame, with a lower end of the slideway at an angle between 16° and 40° in relation to a principal plane of an assembly comprising the generally rectangular swing rod carriage and the pressing block; and a back side of the pressing block is at a same angle in relation to the principal plane of the assembly comprising the generally rectangular swing rod carriage and the pressing block, and the back side of the pressing block is supported on the lower end of the slideway and slides.

11. The adjusting device according to claim 9, wherein the pressing body further comprises a stop part arranged at the hinge point between the first supporting swing rod and the second supporting swing rod and configured to stop the hinge point between the first supporting swing rod and the second supporting swing rod when the first supporting swing rod and the second supporting swing rod return to the 180° vertically aligned state, so that the hinge point between the first supporting swing rod and the second supporting swing rod obtains support.

12. The adjusting device according to claim 2, further comprising an elastic compression element of a lock body of the seat belt fixed to a side of a seat or of a buckle of the seat belt configured so that a user can press the lock body of the sea belt and the buckle of the seat belt downwards by 10-60 millimeters by compressing the elastic compression element after the user fastens the buckle of the seat belt into the lock body of the seat belt, and so that after the elastic compression element is compressed, the elastic compression element can reset automatically.

13. The adjusting device according to claim 12, wherein the elastic compression element comprises a housing, a spring, and a connecting rod, wherein the spring is contained in the housing, one end of the connecting rod is fixedly connected to the lock body of the seat belt or the buckle of the seat belt, a part of the connecting rod passes through a hole of the housing and is received in the housing, and the connecting rod is connected with the spring and can be pressed downwards.

14. The adjusting device according to claim 13, wherein the elastic compression element further comprises an elastic damping member, so that the elastic compression element can be elongated in a damped manner when the strap of the seat belt is subjected to great pulling force.

15. The adjusting device according to claim 13, wherein the housing is enclosed, with a hole for venting to an ambient environment, so that the connecting rod is arranged to reset after the connecting rod is pressed downwards.

16. The adjusting device according to claim 13, wherein the supporting rod has a tail stop part that utilizes a sealing element to seal against an inner wall of the housing, wherein, the tail stop part abuts against the spring, an outer diameter of the tail stop part is greater than an outer diameter of a portion of the supporting rod proximal to the tail stop part, and the tail stop part has a through-hole, so that a space that contains the spring is an only space that vents to an ambient environment via the through-hole and thereby the connecting rod can only reset slowly after the connecting rod is pressed downwards.

17. The adjusting device according to claim 2, wherein the seat belt further comprises a suspender, which is mounted to a vehicle and configured for the strap of the seat belt to pass through and to support the strap of the seat belt.

18. The adjusting device according to claim 2, wherein the seat belt further comprises:

a suspender that is suspended to a vehicle and configured to fix an upper end of the seat belt nearby a shoulder of an occupant of the vehicle, and the retractor, wherein the retractor is arranged near a lower part of a seat at a side of the seat and configured to retract the seat belt inwards; and the adjusting device is arranged at a position between the suspender and the retractor.

19. The adjusting device according to claim 2, wherein the supporting frame is a part of the retractor, so that the adjusting device is integrated in the retractor.

20. The adjusting device according to claim 2, further comprising the retractor, wherein:

the supporting frame is mounted on the retractor at an opening for the strap; or the supporting frame is an integral part of a housing of the retractor.

* * * * *